US011899192B2

(12) United States Patent
Yun et al.

(10) Patent No.: US 11,899,192 B2
(45) Date of Patent: Feb. 13, 2024

(54) OPTICAL SYSTEM

(71) Applicant: 3M INNOVATIVE PROPERTIES COMPANY, St. Paul, MN (US)

(72) Inventors: Zhisheng Yun, Sammamish, WA (US); Timothy L. Wong, West St. Paul, MN (US); Erin A. McDowell, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/093,495

(22) Filed: Jan. 5, 2023

(65) Prior Publication Data

US 2023/0148263 A1    May 11, 2023

Related U.S. Application Data

(62) Division of application No. 16/476,634, filed as application No. PCT/IB2018/051353 on Mar. 2, 2018, now Pat. No. 11,630,290.

(60) Provisional application No. 62/468,579, filed on Mar. 8, 2017.

(51) Int. Cl.
 *G02B 17/08* (2006.01)
 *G02B 27/28* (2006.01)

(52) U.S. Cl.
 CPC ......... *G02B 17/0856* (2013.01); *G02B 27/28* (2013.01)

(58) Field of Classification Search
 CPC .............................. G02B 17/0856; G02B 27/28
 USPC ....................................................... 359/485
 See application file for complete search history.

(56) References Cited

U.S. PATENT DOCUMENTS

| | | | |
|---|---|---|---|
| 5,644,436 | A | 7/1997 | Togino |
| 6,075,651 | A | 6/2000 | Hoppe |
| 2017/0017077 | A1 | 1/2017 | Tang |
| 2021/0286183 | A1 | 9/2021 | Ouderkirk |

FOREIGN PATENT DOCUMENTS

| | | |
|---|---|---|
| CN | 105652460 A | 6/2016 |
| CN | 105929537 | 9/2016 |
| JP | 2000249984 A | 9/2000 |
| WO | WO 1995-24713 | 9/1995 |
| WO | WO 2001-02893 | 1/2001 |
| WO | WO 2018-178817 | 10/2018 |

OTHER PUBLICATIONS

International Search Report for PCT International Application No. PCT/IB2018/051353, dated Jun. 19, 2018, 5 pages.

*Primary Examiner* — Joseph P Martinez
*Assistant Examiner* — Grant A Gagnon
(74) *Attorney, Agent, or Firm* — Jonathan L. Tolstedt

(57) ABSTRACT

An optical system for displaying an image to a viewer includes a partial reflector, a reflective polarizer, and a first retarder layer. A light ray propagates along the optical axis and passes through the plurality of optical lenses, the partial reflector, the reflective polarizer, and the first retarder layer without being substantially refracted. For a cone of light incident on the optical system from an object comprising a spatial frequency of about 70, 60, 50, 40, or 30 line pairs per millimeter and filling the exit pupil with a chief ray of the cone of light passing through a center of the opening of the exit pupil of the optical system and making an angle of about 20 degrees with the optical axis, a modulation transfer function of the optical system is greater than about 0.2.

5 Claims, 11 Drawing Sheets

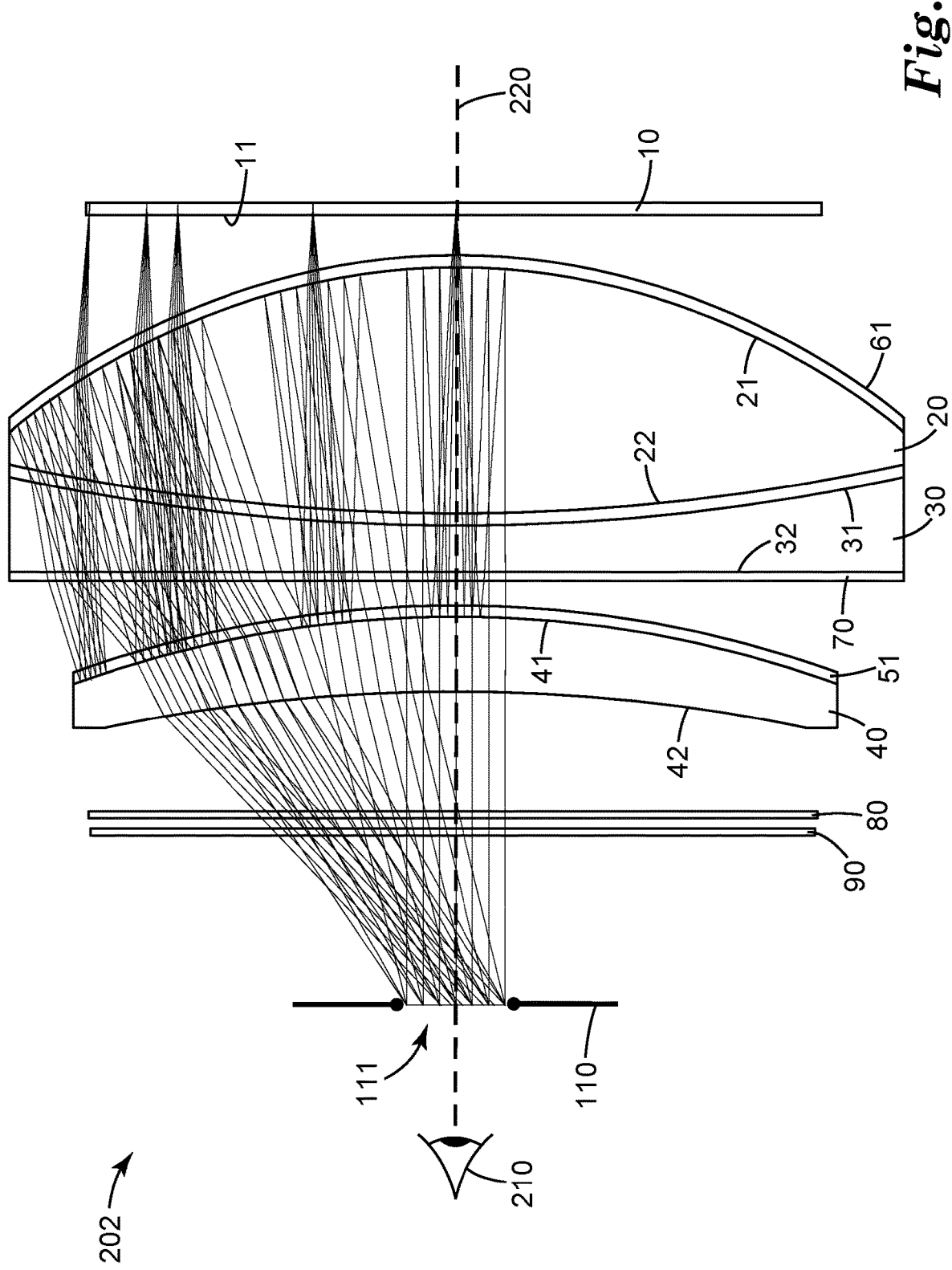

OPTICAL SYSTEM

CROSS REFERENCE TO RELATED APPLICATION

This application is a divisional filing of U.S. application Ser. No. 16/476,634, filed Jul. 9, 2019, now allowed, which is a national stage filing under 35 C.F.R. 371 of PCT/IB2018/051353, filed Mar. 2, 2018, which claims the benefit of U.S. Provisional Application No. 62/468,579, filed Mar. 8, 2017, the disclosures of which are incorporated by reference in their entireties herein.

TECHNICAL FIELD

This disclosure relates generally to an optical system and to optical components and methods relevant folded optics.

BACKGROUND

Many displays, including virtual reality (VR) displays, attempt to present realistic images that replicate a real or imaginary environment. In some applications, VR displays attempt to provide immersive simulation of a three-dimensional environment.

BRIEF SUMMARY

Some embodiments involve an optical system for displaying an image to a viewer. The system includes a plurality of optical lenses comprising first, second, and third optical lenses. The second lens is disposed between the first and third lenses. Each of the first and second lenses has an optical birefringence less than about 20 nm/cm. The third lens has an optical birefringence greater than about 10 nm/cm. Each lens has opposing first and second major surfaces. The first and second major surfaces of the first lens are substantially spherical and concave toward each other. The first major surface has a radius of curvature in a range from about 10 mm to about 500 mm. The second major surface has a radius of curvature in a range from about 16 mm to about 1500 mm. The first major surface of the second lens is substantially spherical, adjacent to and concave toward the second major surface of the first lens. The first major surface of the second lens has a radius of curvature greater than about 16 mm to about 1500 m. The first major surface of the third lens is adjacent to and convex toward the second major surface of the second lens. The first major surface of the third lens has a radius of curvature in a range from about 14 mm to about 800 mm. The second major surface of the third lens is convex toward the first major surface of the third lens, and has a radius of curvature in a range from about 18 mm to about 1300 mm. The optical system also includes a partial reflector having an average optical reflectance of at least 30% in a predetermined wavelength range. A reflective polarizer substantially reflects light having a first polarization state and substantially transmits light having an orthogonal second polarization state in the predetermined wavelength range. A first retarder layer is disposed on and conforms to the substantially flat second major surface of the second lens.

Some embodiments involve an optical system for displaying an image to a viewer. The system includes a plurality of optical lenses comprising at least one first lens that includes a glass and at least one second lens that includes a plastic. A partial reflector is disposed on and conforms to a curved major surface of the at least one first lens and has an average optical reflectance of at least 30% in a predetermined wavelength range. A reflective polarizer is disposed on and conforms to a curved major surface of the at least one second lens. The reflective polarizer substantially reflects light having a first polarization state and substantially transmits light having an orthogonal second polarization state in the predetermined wavelength range. A first retarder layer is disposed on and conforms to a major surface of plurality of optical lenses between the reflective polarizer and the partial reflector. The system also includes an exit pupil defining an opening therein. The optical system has an optical axis. A light ray propagates along the optical axis passing through the plurality of optical lenses, the partial reflector, the reflective polarizer, and the first retarder layer without being substantially refracted. For a cone of light incident on the optical system from an object comprising a spatial frequency of about 70, or about 60, or about 50, or about 40, or about 30 line pairs per millimeter, filling the exit pupil with a chief ray of the cone of light passing through a center of the opening of the exit pupil and making an angle (θ) of about 20 degrees with the optical axis, a modulation transfer function (MTF) of the optical system is greater than about 0.2.

Some embodiments are directed to an optical system for displaying an image to a viewer. The system includes an imager emitting an image. An exit pupil defines an opening therein. The image emitted by the imager exits the optical system through the opening of the exit pupil. A plurality of optical lenses is disposed between the imager and the exit pupil and receives the emitted image from the imager. The optical lenses include first, second, and third optical lenses. The third lens has an optical birefringence greater than about 10 nm/cm. The first and second lens each have an optical birefringence less than about 7 nm/cm and bonded to each other to form a doublet. A partial reflector is disposed on and conforms to a curved major surface of the doublet and has an average optical reflectance of at least 30% in a predetermined wavelength range. A reflective polarizer is disposed on and conforms to a curved major surface of the third lens. The reflective polarizer substantially reflects light and has a first polarization state and substantially transmits light having an orthogonal second polarization state in the predetermined wavelength range. A first retarder layer is disposed on and conforms to a major surface of the doublet. For a cone of light from an image emitted by the imager, the image comprises a spatial frequency of about 70 or about 60 or about 50 or about 40 or about 30 line pairs per millimeter, fills the exit pupil. A chief ray of the cone of light passes through a center of the opening of the exit pupil and makes an angle of about 40 degrees with an optical axis of the optical system. A modulation transfer function (MTF) of the optical system is greater than about 0.15.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

FIGS. 1A-1D are diagrams illustrating folded optical systems in which a light beam is bent as it traverses the system so that the optical path of the light is longer than the length of the system in accordance with some embodiments;

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Figure 1A:
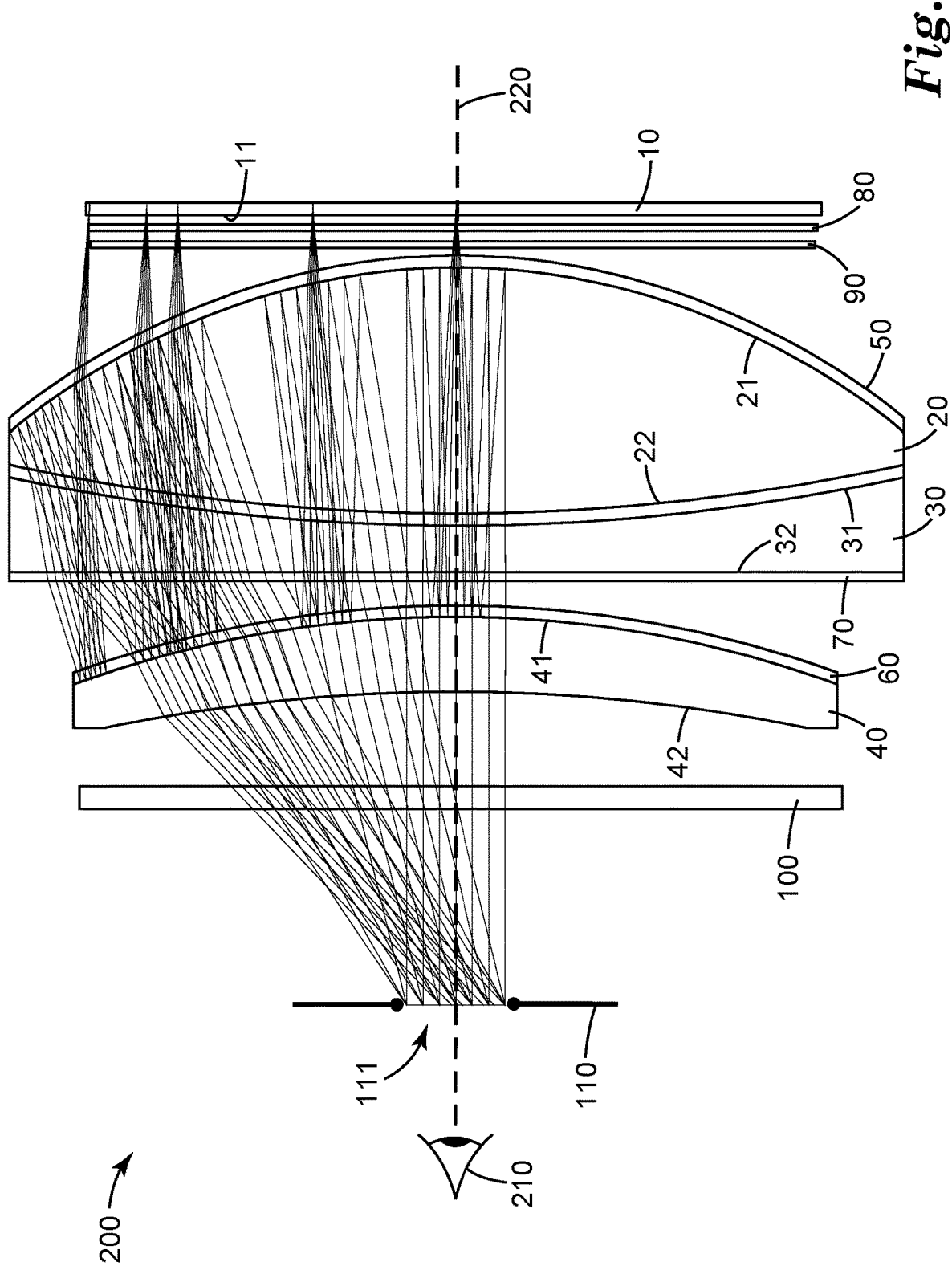

FIG. 1A is a diagram illustrating a folded optical system 200 in which a light beam is bent as it traverses the system so that the optical path of the light is longer than the length of the system. Optical systems disclosed herein employ folded optics and are useful for headmounted displays, such as virtual reality displays, and cameras, such as cameras included in a cell phone, for example. The disclosed optical systems include a reflective polarizer, multiple lenses, and/or a retarder disposed between a stop surface (e.g., an exit pupil or an entrance pupil) and an image surface (e.g., a surface of a display panel or a surface of an image recorder). These systems can provide an optical system having a high field of view, a high contrast, a low chromatic aberration, a low distortion, and/or a high efficiency in a compact configuration that is useful in various applications.

It can be desirable for a compact optical system for virtual reality applications to have high resolution (small spot size), and a wide field of view (FOV). The wide field of view provides for an immersive experience for the viewer. The small spot size makes the images sharp and clear. When traversing through the optical system from the image to the exit pupil, the spot size increases due to various aberrations including spherical aberrations, comatic aberrations, astigmatism, etc. Aberrations of the lenses and the wave-like nature of light cause light originating from one point of the image 11 (see e.g., FIG. 1A) to be distributed over an area around the ideal point at the exit pupil opening 111. Such aberrations should be reduced to provide the desirable aspects of small spot size with a large field of view.

The modulation optical transfer function (MTF) is a measure of image quality characterizing the ability of an optical system to transfer contrast from an image 11 to the exit pupil opening 111. The MTF is related spot size by Fourier transformation from the spatial domain (spot size) to the frequency domain (MTF). The MTF (and spot size) of an optical system can be expressed as a function of spatial frequency. Spatial frequency quantifies the level of detail present in an image at the exit pupil opening and is often specified in units of line pairs per mm. High spatial frequency images have a larger amount of detail than images of lower spatial frequency. MTF can be determined for tangential and sagittal orientations at different wavelengths of light and at different angles of light with respect to the optical axis.

Some embodiments disclosed herein are directed to folded optical systems that have a specified, e.g., high, MTF at a predetermined spatial frequency. The systems disclosed herein include multiple lenses with optical qualities that, when used in conjunction with a reflective polarizer and at least one retarder layer, provide for the MTFs that enhance the viewer experience of an immersive three dimensional virtual environment.

FIG. 1A is a side view diagram of an optical system 200 in accordance with some embodiments. The optical system 200 is configured to display an image 11 to a viewer 210 through an opening 111. The first lens 20 is configured to receive the image 11 from an imager 10. In some configurations, the image incident on the first lens 20 is elliptically polarized. In some configurations, the image incident on the first lens 20 is circularly polarized.

Each lens 20, 30, 40 has opposing first 21, 31, 41 and second 22, 32, 42 major surfaces. The first 21 and second 22 major surfaces of the first lens 20 may be substantially spherical and concave toward each other. The first major surface 21 of the first lens 20 can have a radius of curvature in a range from about 10 mm to about 500 mm. The second major surface 22 of the first lens 20 can have a radius of curvature in a range from about 16 mm to about 1500 mm. The first lens 20 can have an index of refraction of about 1.52 at about 550 nm or at 587.6 nm, for example.

The first major surface 31 of the second lens 30 may be substantially spherical, adjacent to, and concave toward the second major surface 22 of the first lens 20. In some configurations, the first major surface 31 of the second lens 30 is bonded to the second major surface 22 of the first lens 20, e.g., via an optical adhesive.

The first major surface 31 of the second lens 30 may have a radius of curvature greater than about 16 mm to about 1500 mm. The second major surface 32 of the second lens 30 can be substantially flat in some configurations. The second major surface 32 of the second lens 30 may have a radius of curvature greater than about 100 mm or even greater than 2000 mm, for example. According to some embodiments, the radius of curvature of the first major surface 31 of the second lens 30 is substantially equal to the radius of curvature of the second major surface 22 of the first lens 20. In some configurations, the second lens 30 may have an index of refraction of about 1.62 at about 550 nm, e.g., at 587.6 nm.

The first major surface 41 of the third lens 40 can be adjacent to and convex toward the second major surface 32 of the second lens 30. The first major surface 41 of the third lens 40 may have a radius of curvature in a range from about 14 mm to about 800 mm. The second major surface 42 of the third lens 40 may be convex toward the first major surface 41 of the third lens 40. The second major surface 42 of the third lens 40 can have a radius of curvature in a range from about 18 mm to about 1300 mm. In some embodiments, the third lens 40 has an index of refraction of about 1.49 at about 550 nm, e.g., 587.6 nm.

The system 200 includes a partial reflector 50 that is disposed on and conforms to the first curved major surface 21 of the first lens 20. According to some embodiments, the partial reflector 50 may have an average optical reflectance of at least 30% in a predetermined wavelength range.

A reflective polarizer 60 is disposed on and conforms to the first major surface 41 of the third lens 40. The reflective polarizer 60 substantially reflects light having a first polarization state and substantially transmits light having an orthogonal second polarization state in the predetermined wavelength range.

A first retarder layer 70 is disposed on and conforms to the second major surface 32 of the second lens 30. The first retarder layer 70 can be substantially a quarter wave retarder at at least one wavelength in the predetermined wavelength range in some embodiments. Some configurations of the optical system 200 include a second retarder layer 90, wherein the first lens 20 is disposed between the second lens 30 and the second retarder layer 90. Optionally, the optical system 200 includes a first linear absorbing polarizer 80. For example, the second retarder layer 90 may be disposed between the first lens 20 and the first linear absorbing polarizer 80. Optionally, the optical system 200 includes a linear absorbing polarizer 100, wherein the third lens 40 is disposed between the linear absorbing polarizer 100 and the reflective polarizer 60.

In some embodiments, the optical system includes each of the second retarder layer 90, the first linear absorbing polarizer 80, and the second linear absorbing polarizer 100. The first lens 20 is disposed between the second lens 30 and the second retarder layer 90. The second retarder layer 90 is disposed between the first lens 20 and the first linear absorbing polarizer 80. The third lens 40 is disposed between the second linear absorbing polarizer 100 and the reflective polarizer 60.

In some configurations, the predetermined wavelength range may comprise a wavelength of about 550 nm, e.g., may comprise the wavelength 587.6 nm. The predetermined wavelength range may extend from about 400 nm to about 700 nm in some embodiments. For example, the predetermined wavelength can include a blue primary color wavelength, a green primary color wavelength and a red primary color wavelength.

The optical system 200 has an optical axis 220. The optical system is configured such that a light ray propagating along the optical axis 220 passes through the plurality of optical lenses 20, 30, 40, the partial reflector 50, the reflective polarizer 60, and the first retarder layer 70 without being substantially refracted. In some configurations, at least one of the plurality of optical lenses 20, 30, 40, the partial reflector 50, the reflective polarizer 60, and the first retarder layer 70 is rotationally symmetric. In some configurations, at least one of the plurality of optical lenses 20, 30, 40, the partial reflector 50, the reflective polarizer 60, and the first retarder layer 70 is non-rotationally symmetric. For example, at least one of the plurality of optical lenses 20, 30, 40, the partial reflector 50, the reflective polarizer 60, and the first retarder layer 70 may have at least one plane of symmetry.

As shown in FIG. 1A, the optical system 200 can includes a plurality of optical lenses, e.g., at least at least first 20, second 30 and third 40 optical lenses. The second lens 30 is disposed between the first 20 and third 40 lenses. Each of the first 20 and second 30 lenses may have an optical birefringence less than about 20 nm/cm. The third lens 40 may have an optical birefringence greater than about 10 nm/cm.

According to some implementations, each of the first 20 and second 30 lenses has an optical birefringence less than about 15 nm/cm, less than about 10 nm/cm, less than about 7 nm/cm, or even less than about 5 nm/cm. The third lens 40 may have an optical birefringence greater than about 15 nm/cm or greater than about 20 nm/cm. The optical birefringence values cited herein for the first and second lenses provide for reduced leakage of the non-imaging rays through the reflective polarizer. The second major surface 32 of the second lens 30 may have a radius of curvature greater than about 2000 mm, for example.

The one or more of the lenses 20, 30, 40, of the optical system 200 may be made of any suitable material such as glass. For example, one or more of the lenses e.g., the first and/or second lenses may comprise one or more of a borosilicate BK7 glass, a lanthanum crown LAK34, a lanthanum flint LAF7 glass, a flint F2 glass, a dense flint SF2, a lanthanum dense flint LASF45, and a fluorophosphate FPL51 and a fluorophosphate FPL55 glass.

The index of refraction of the material of the first lens 20 may be about 1.44, or about 1.50 or about 1.52 at wavelengths of about 550 nm, e.g., 587.6 nm. The first lens 20 may comprise one of more of a borosilicate BK7 glass, a fluorophosphate FPL51 glass, and a fluorophosphate FPL55 glass, for example.

The index of refraction of the material of the second lens 30 may be about 1.65 or about 1.73, or about 1.75, or about 1.80 at wavelengths of about 550 nm, e.g., 587.6 nm. The second lens 30 may comprise one or more of a dense flint SF2 glass, a lanthanum dense flint LASF45 glass, a lanthanum crown LAK34 glass, a lanthanum crown LAK33B glass, a lanthanum crown LAK33A glass, a lanthanum crown LAF7 glass, lanthanum flint LAK34 glass, a lanthanum flint LAF7 glass, and a flint F2 glass, for example.

Example combination configurations for the first 20 and second 30 lenses include: 1) the first lens 20 comprises a borosilicate BK7 glass having an index of refraction of about 1.52 at about 550 nm, e.g., 587.6 nm, and the second lens 30 comprises a dense flint SF2 glass having an index of refraction of about 1.65 at about 587.6 nm; 2) the first lens 20 comprises a fluorophosphate FPL51 glass having an index of refraction of about 1.50 at about 550 nm, e.g., 587.6 nm, and the second lens 30 comprises a lanthanum dense flint LASF45 glass having an index of refraction of about 1.80 at about 550 nm, e.g., 587.6 nm; 3) the first lens 20 comprises a fluorophosphate FPL51 glass having an index of refraction of about 1.50 at about 550 nm, e.g., 587.6 nm, and the second lens 30 comprises a lanthanum crown LAK34 glass having an index of refraction of about 1.73 at about 550 nm, e.g., 587.6 nm; 4) the first lens 20 comprises a fluorophosphate FPL51 glass having an index of refraction of about 1.50 at about 550 nm, e.g., 587.6 nm, and the second lens 30 comprises a lanthanum crown LAK33B glass having an index of refraction of about 1.76 at about 550 nm, e.g., 587.6 nm; 5) the first lens 20 comprises a fluorophosphate FPL51 glass having an index of refraction of about 1.50 at about 550 nm, e.g., 587.6 nm, and the second lens 30 comprises a lanthanum crown LAK33A glass having an index of refraction of about 1.75 at about 550 nm, e.g., 587.6 nm; 6) the first lens 20 comprises a fluorophosphate FPL55 glass having an index of refraction of about 1.44 at about 550 nm, e.g., 587.6 nm, and the second lens 30 comprises a lanthanum crown LAK34 glass having an index of refraction of about 1.73 at about 550 nm, e.g., 587.6 nm; 7) the first lens 20 comprises a fluorophosphate FPL51 glass having an index of refraction of about 1.50 at about 550 nm, e.g., 587.6 nm, and the second lens 30 comprises a lanthanum crown LAF7 glass having an index of refraction of about 1.75 at about 550 nm, e.g., 587.6 nm; 8) the first lens 20 comprises a fluorophosphate FPL55 glass having an index of refraction of about 1.44 at about 550 nm, e.g., 587.6 nm, and the second lens 30 comprises a lanthanum flint LAK34 glass having an index of refraction of about 1.73 at about 550 nm, e.g., 587.6 nm; 9) first lens 20 comprises a fluorophosphate FPL55 glass having an index of refraction of about 1.44 at about 550 nm, e.g., 587.6 nm, and the second lens 30 comprises a lanthanum flint LAF7 glass having an index of refraction of about 1.75 at about 550 nm, e.g., 587.6 nm; 10) the first lens 20 comprises a borosilicate BK7 glass having an index of refraction of about 1.52 at about 550 nm, e.g., 587.6 nm, and the second lens 30 comprises a flint F2 glass having an index of refraction of about 1.62 at about 550 nm, e.g., 587.6 nm.

The third lens 40 may be made of plastic, such as one or more of polymethylmethacrylate (PMMA), a polystyrene, a polyvinyl alcohol, and a polycarbonate. In some embodiments, the third lens 40 has an index of refraction of about 1.49 at about 550 nm, e.g., 587.6 nm.

As shown in FIG. 1A, the imager 10 can be disposed adjacent to and facing the first lens 20. The imager 10 emits the image 11 which is incident on the first lens 20. An exit pupil 110 is disposed adjacent and facing the third lens 40 and defines an opening 111 therein. The image 11 incident on the first lens 20 exits the optical system 200 through the opening 111 in the exit pupil 110. The image 11 incident on the first lens 20 may be elliptically polarized. The exiting image at the opening 111 may be substantially linearly polarized.

Figure 1B:
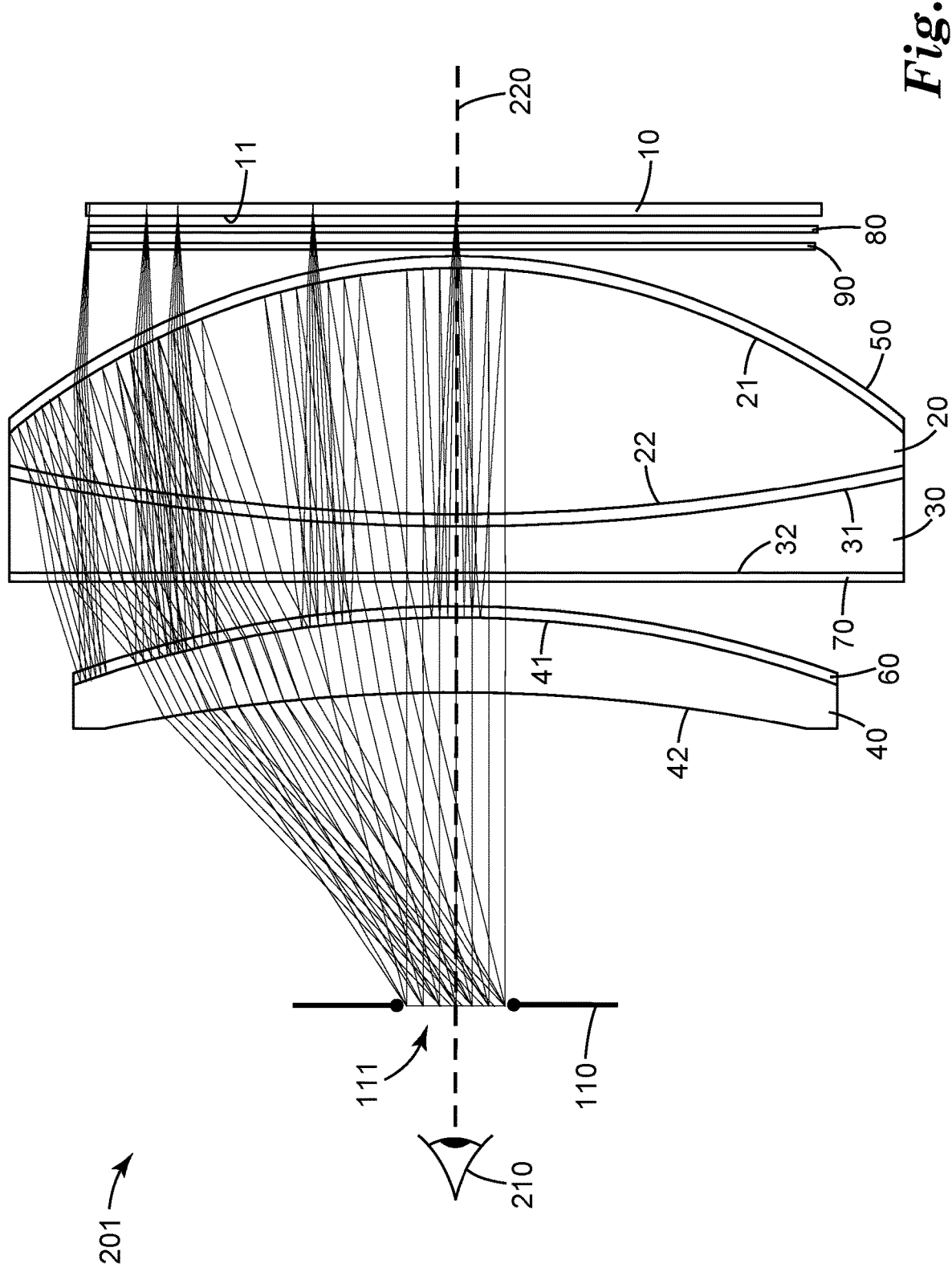

FIG. 1B shows an optical system 201 that is similar in many respects to the optical system 200 of FIG. 1A. Optical system 201 differs at least in that system 201 does not include the second linear absorbing polarizer (element 100 in FIG. 1A).

FIG. 1C shows another optical system 202 that has some similarities to FIG. 1A. The optical system 202 includes a half mirror 51 disposed on and conforming to the first major surface 41 of the third lens 40. The system 202 also includes a reflective polarizer 61 disposed on and conforming to the first major surface 21 of the first lens. In the system 202, the second retarder layer 90 is disposed adjacent to the exit pupil 110. The first linear absorbing polarizer 80 is disposed between the second retarder layer 90 and the third lens 40.

Figure 1D:
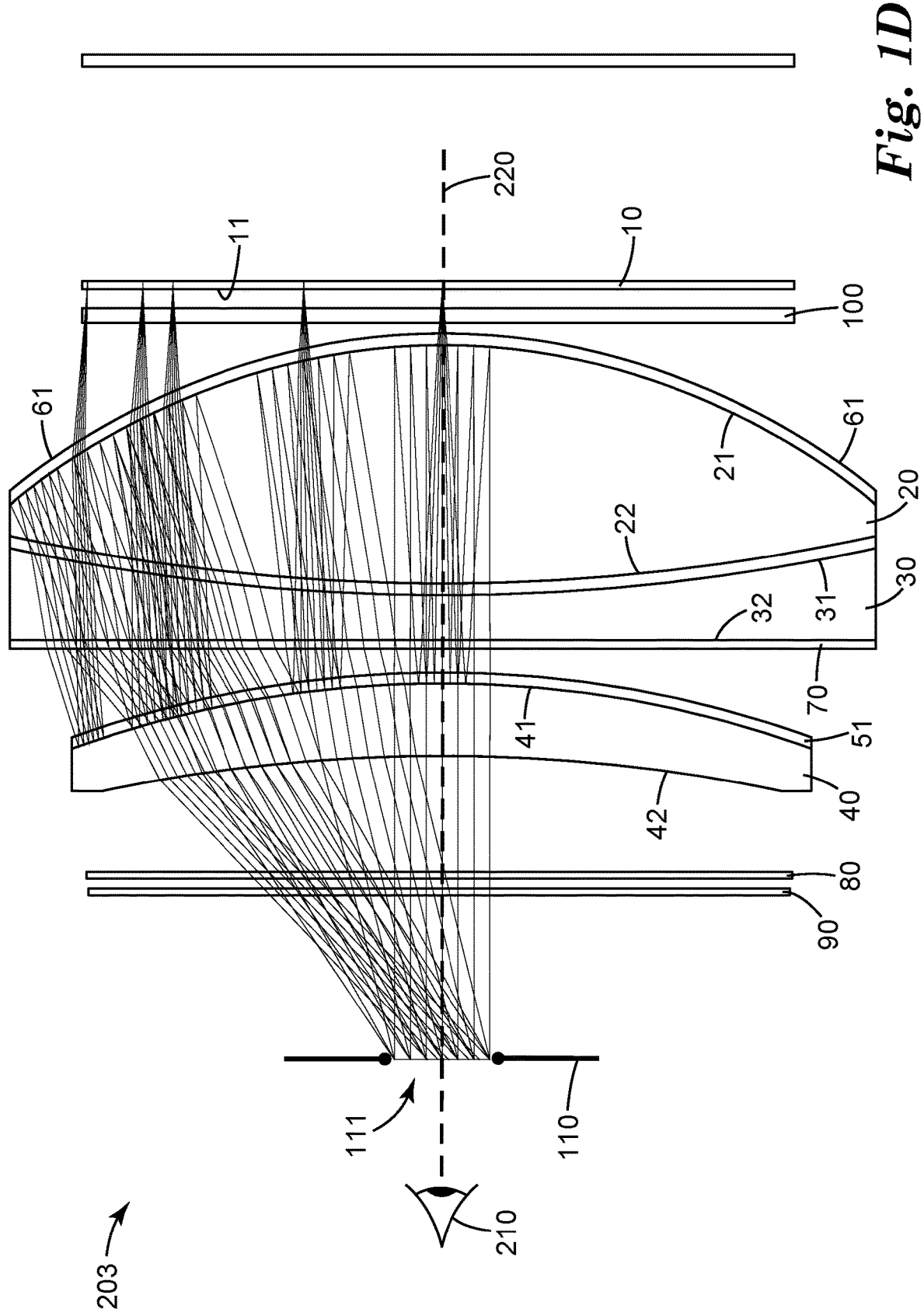

FIG. 1D shows yet another optical system 203 in accordance with some embodiments. FIG. 1D is similar in many respects to the system 202 of FIG. 1C. System 203 also includes a second linear absorbing polarizer 100 disposed between the imager 10 and the first lens 20.

Figure 2A:
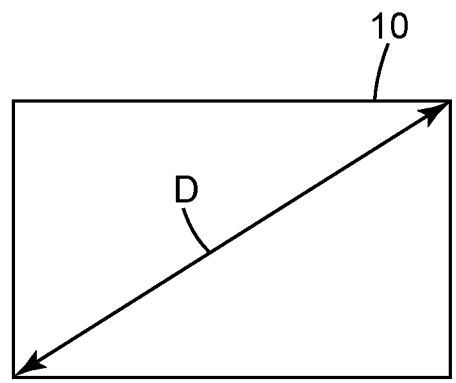
FIG. 2A shows an imager in accordance with some embodiments.
Figure 2B:
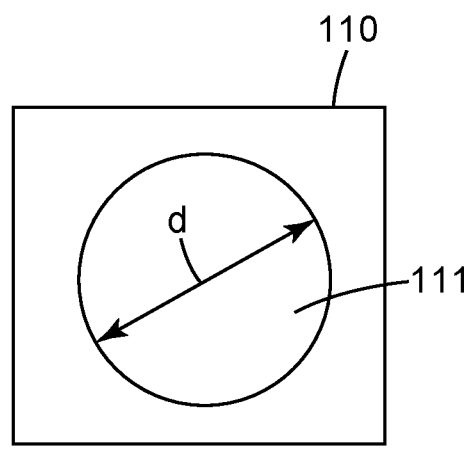
FIG. 2B shows the opening of the exit pupil of an optical system of in accordance with some embodiments.

As shown in FIG. 2A, the imager can be substantially a polygon. FIG. 2B shows the opening 111 of the exit pupil 110 which is substantially circular. As shown in FIGS. 2A and 2B, a maximum lateral dimension of an active region of the imager is D (see FIG. 2A) and a maximum lateral dimension of the opening of the exit pupil is d (see FIG. 2B). In some embodiments the ratio D/d is between about 1 and about 20, e.g., 1≤D/d≤20. In some embodiments, the ratio of D/d is between about 2 and about 15, e.g., 2≤D/d≤15. In some embodiments the ratio of D/d is between about 5 and about 10, e.g., 5≤D/d≤10.

The maximum lateral dimension of the opening 111 of the exit pupil 110 can be in a range from about 2 mm to about 10 mm or in a range from about 2 mm to about 80 mm. A separation between the exit pupil 110 and the third lens 40 can be in a range from about 5 mm to about 30 mm or in a range from about 10 mm to about 20 mm, for example.

Figure 3:
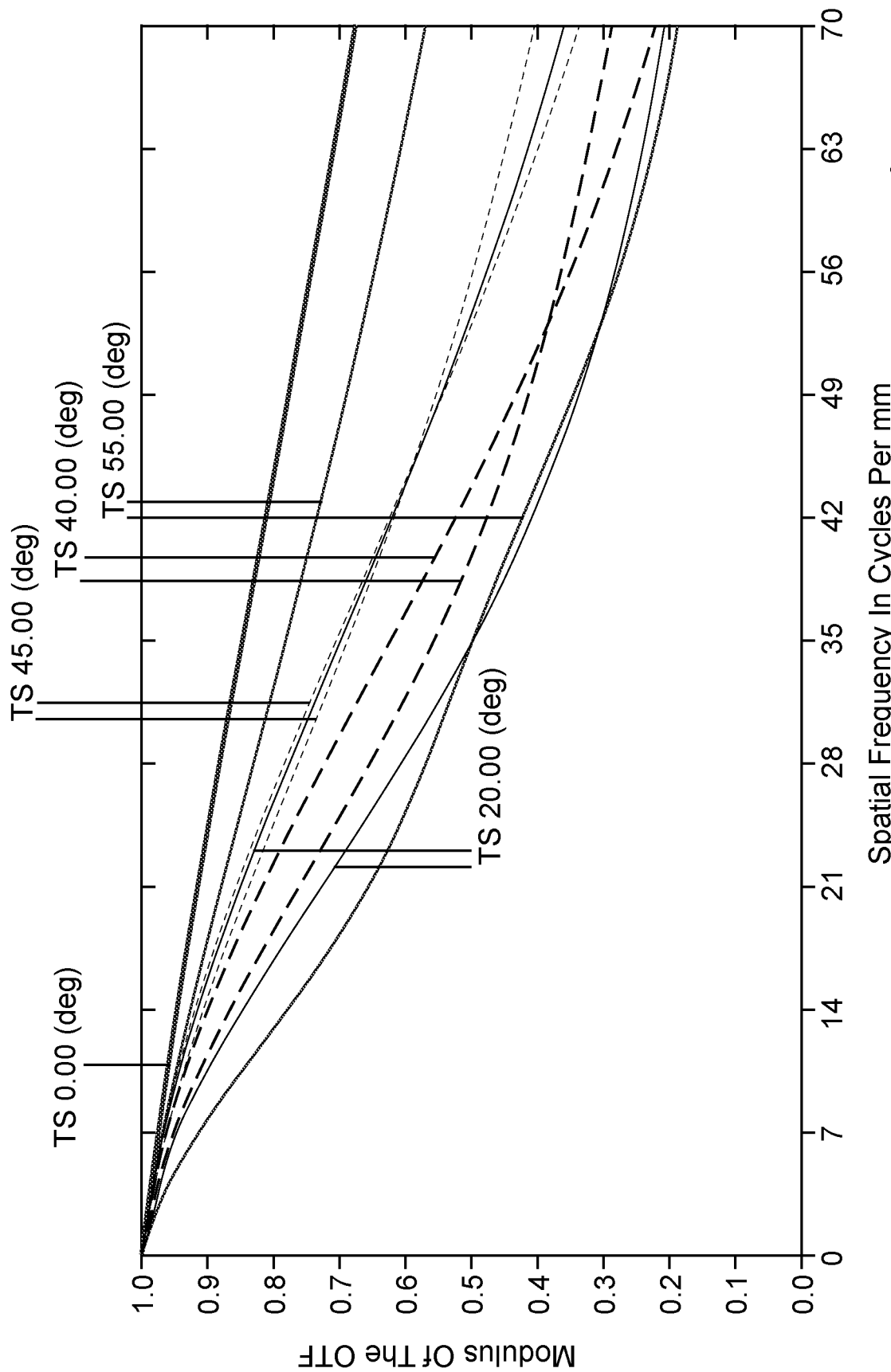
FIG. 3 shows a family of curves representing the modulation transfer function (Modulus of optical transfer function (OTF)) plotted along the y axis as a function of the spatial frequency in cycles per millimeter (also referred to as line pairs per millimeter) along the x-axis for an optical system in accordance with some embodiments.

According to some embodiments, the optical system 200 provides a specified modulation transfer function. FIG. 3 shows a family of curves representing the modulation transfer function (Modulus of optical transfer function (OTF)) plotted along the y axis as a function of the spatial frequency in cycles per millimeter (also referred to as line pairs per millimeter) along the x-axis. The family of curves provides the MTF vs. spatial frequency for the optical system for various angles of light at the exit pupil opening 111 with respect to the optical axis 220 of the optical system 200. As indicated in FIG. 3, the MTF vs. spatial frequency curves are plotted for 0, 20, 40, 45, and 55 degree angles of light at the exit pupil opening 111 for both transverse (T) and sagittal (S) orientations.

Referring again to FIG. 1A, some embodiments involve an optical system 200 for displaying an image 11 to a viewer 210. The system 200 includes a plurality of optical lenses including at least one first lens 20, 30 comprising a glass and at least one second lens 40 comprising a plastic. A partial reflector 50 is disposed on and conforms to a curved major surface 21 of the at least one first lens 20. The partial reflector 50 may have an average optical reflectance of at least 30% in a predetermined wavelength range. The system 200 also includes a reflective polarizer 60 disposed on and conforming to a curved major surface 41 of the at least one second lens. The reflective polarizer 60 substantially reflects light having a first polarization state and substantially transmits light having an orthogonal second polarization state in the predetermined wavelength range. A first retarder layer 70 is disposed on and conforms to a major surface 32 of plurality of optical lenses 20, 30, 40 between the reflective polarizer 60 and the partial reflector 50. An exit pupil 110 of the system 200 defines an opening 111.

The optical system 200 has an optical axis 220. A light ray propagating along the optical axis 220 passes through the plurality of optical lenses 20, 30, 40, the partial reflector 50, the reflective polarizer 60, and the first retarder layer 70 without being substantially refracted.

Figure 4:
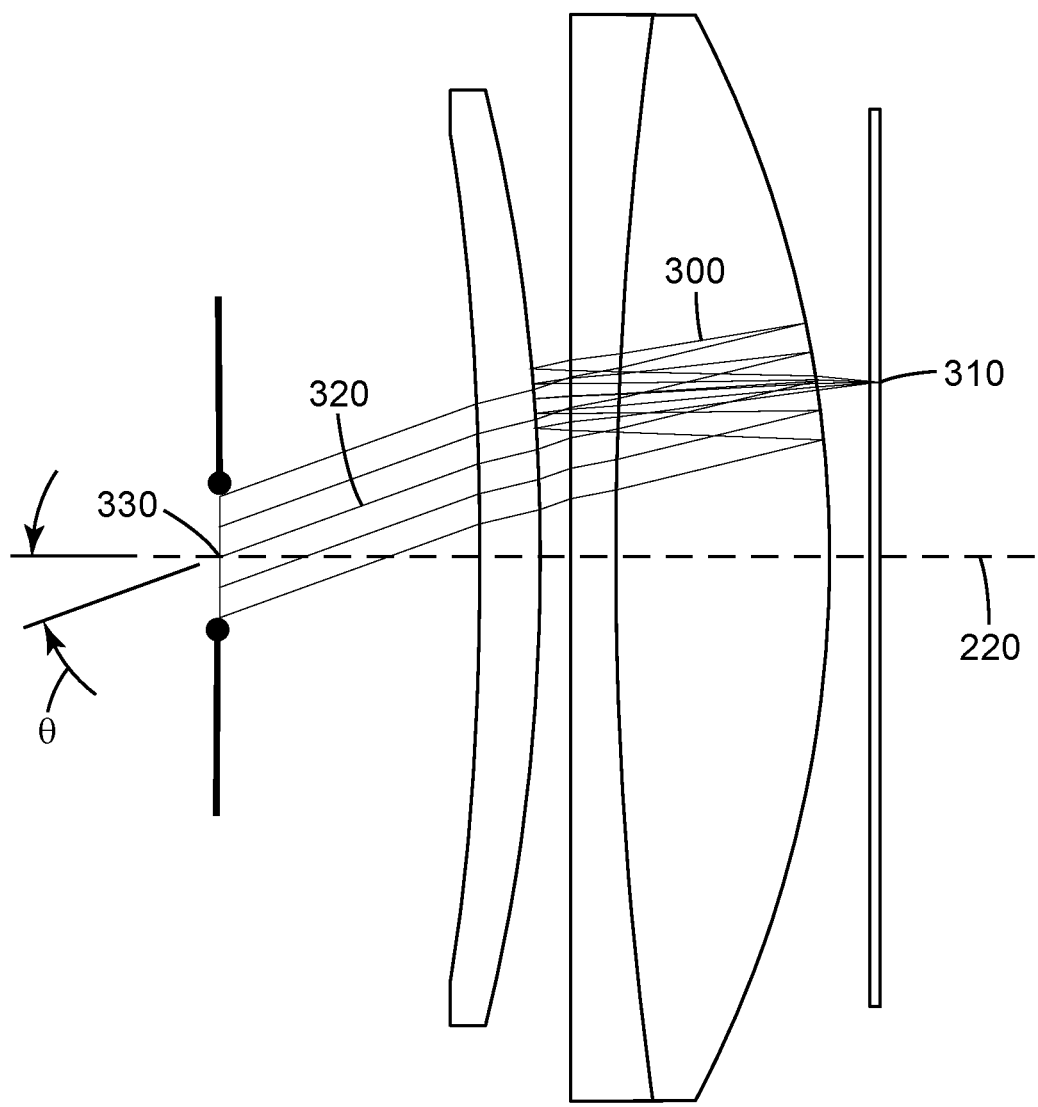
FIG. 4 shows an optical system in which a chief ray of the cone of light from an object passes through the center of the opening of the exit pupil and makes an angle of about 20 degrees with the optical axis.

As shown in FIG. 4, a cone of light 300 is incident on the optical system 200 from an object 310 may comprise a spatial frequency of about 70 line pairs per millimeter, the cone of light filling the opening 111 of the exit pupil 110. A chief ray 320 of the cone of light 300 passes through a center 330 of the opening 111 of the exit pupil 110 and makes an angle (θ) of about 20 degrees with the optical axis 220. A modulation transfer function (MTF) of the optical system 200 can be greater than about 0.2, or greater than about 0.25, or even greater than about 0.3.

A cone of light 300 is incident on the optical system 200 from an object 310 may comprise a spatial frequency of about 60 line pairs per millimeter, the cone of light filling the opening 111 of the exit pupil 110. A chief ray 320 of the cone of light 300 passes through a center 330 of the opening 111 of the exit pupil 110 and makes an angle (θ) of about 20 degrees with the optical axis 220. A modulation transfer function (MTF) of the optical system 200 can be greater than about 0.2, or greater than about 0.25, or even greater than about 0.3.

A cone of light 300 is incident on the optical system 200 from an object 310 may comprise a spatial frequency of about 50 line pairs per millimeter, the cone of light filling the opening 111 of the exit pupil 110. A chief ray 320 of the cone of light 300 passes through a center 330 of the opening 111 of the exit pupil 110 and makes an angle (θ) of about 20 degrees with the optical axis 220. A modulation transfer function (MTF) of the optical system 200 can be greater than about 0.2, or greater than about 0.25, or even greater than about 0.3.

A cone of light 300 is incident on the optical system 200 from an object 310 may comprise a spatial frequency of about 40 line pairs per millimeter, the cone of light filling the opening 111 of the exit pupil 110. A chief ray 320 of the cone of light 300 passes through a center 330 of the opening 111 of the exit pupil 110 and makes an angle (θ) of about 20 degrees with the optical axis 220. A modulation transfer function (MTF) of the optical system 200 can be greater than about 0.2, or greater than about 0.25, or even greater than about 0.3.

A cone of light 300 is incident on the optical system 200 from an object 310 comprising a spatial frequency of about 30 line pairs per millimeter, the cone of light filling the opening 111 of the exit pupil 110. A chief ray 320 of the cone of light 300 passes through a center 330 of the opening 111 of the exit pupil 110 and makes an angle (θ) of about 20 degrees with the optical axis 220. A modulation transfer function (MTF) of the optical system 200 can be greater than about 0.2, or greater than about 0.25, or even greater than about 0.3.

Figure 5:
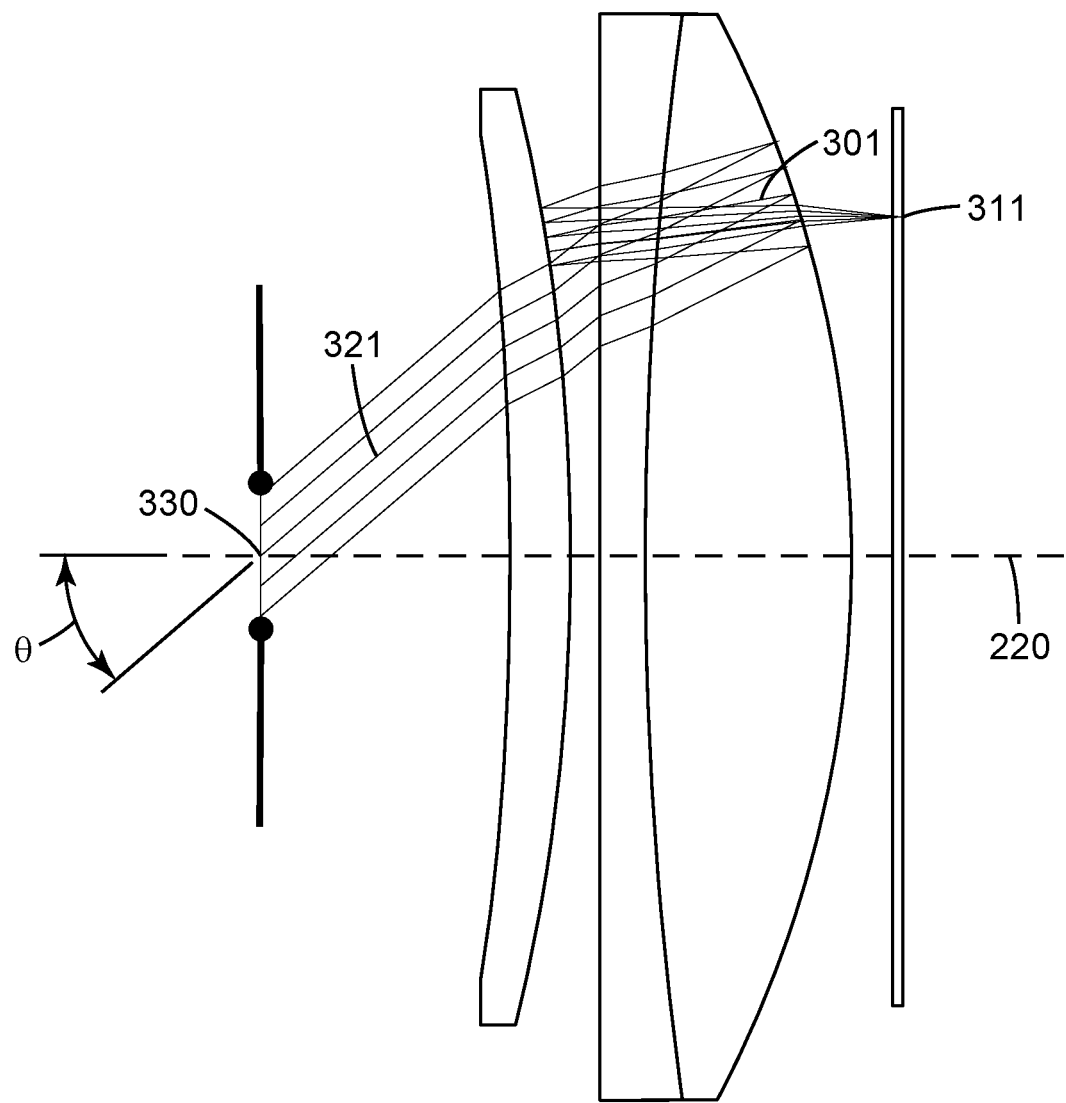
FIG. 5 shows an optical system in which a chief ray of the cone of light from an object passes through the center of the opening of the exit pupil and makes an angle of about 40 degrees with the optical axis.

Referring now to FIG. 5, a cone of light 301 is incident on the optical system 200 from an object 311 and may comprise a spatial frequency of about 70 line pairs per millimeter. The cone of light 301 fills the opening 111 of the exit pupil 110. A chief ray 321 of the cone of light 301 passes through the center 330 of the opening 110 of the exit pupil 111 and makes an angle (θ) of about 40 degrees with the optical axis 220, according to some embodiments, the modulation transfer function (MTF) of the optical system 200 may be greater than about 0.1, or greater that about 0.15, or even greater than 0.2.

A cone of light 301 is incident on the optical system 200 from an object 311 and may comprise a spatial frequency of about 60 line pairs per millimeter. The cone of light 301 fills the opening 111 of the exit pupil 110. A chief ray 321 of the cone of light 301 passes through the center 330 of the opening 110 of the exit pupil 111 and makes an angle (θ) of about 40 degrees with the optical axis 220. According to some embodiments, the modulation transfer function (MTF) of the optical system 200 may be greater than about 0.1, or greater that about 0.15, or even greater than 0.2.

A cone of light 301 is incident on the optical system 200 from an object 311 and may comprise a spatial frequency of about 50 line pairs per millimeter. The cone of light 301 fills the opening 111 of the exit pupil 110. A chief ray 321 of the cone of light 301 passes through the center 330 of the opening 110 of the exit pupil 111 and makes an angle (θ) of about 40 degrees with the optical axis 220. According to some embodiments, the modulation transfer function (MTF) of the optical system 200 may be greater than about 0.1, or greater that about 0.15, or even greater than 0.2.

A cone of light 301 is incident on the optical system 200 from an object 311 and may comprise a spatial frequency of about 40 line pairs per millimeter. The cone of light 301 fills the opening 111 of the exit pupil 110. A chief ray 321 of the cone of light 301 passes through the center 330 of the opening 110 of the exit pupil 111 and makes an angle (θ) of about 40 degrees with the optical axis 220. According to some embodiments, the modulation transfer function (MTF) of the optical system 200 may be greater than about 0.1, or greater that about 0.15, or even greater than 0.2.

A cone of light 301 is incident on the optical system 200 from an object 311 and may comprise a spatial frequency of about 30 line pairs per millimeter. The cone of light 301 fills the opening 111 of the exit pupil 110. A chief ray 321 of the cone of light 301 passes through the center 330 of the opening 110 of the exit pupil 111 and makes an angle (θ) of about 40 degrees with the optical axis 220. According to some embodiments, the modulation transfer function (MTF) of the optical system 200 may be greater than about 0.1, or greater that about 0.15, or even greater than 0.2.

Figure 6:
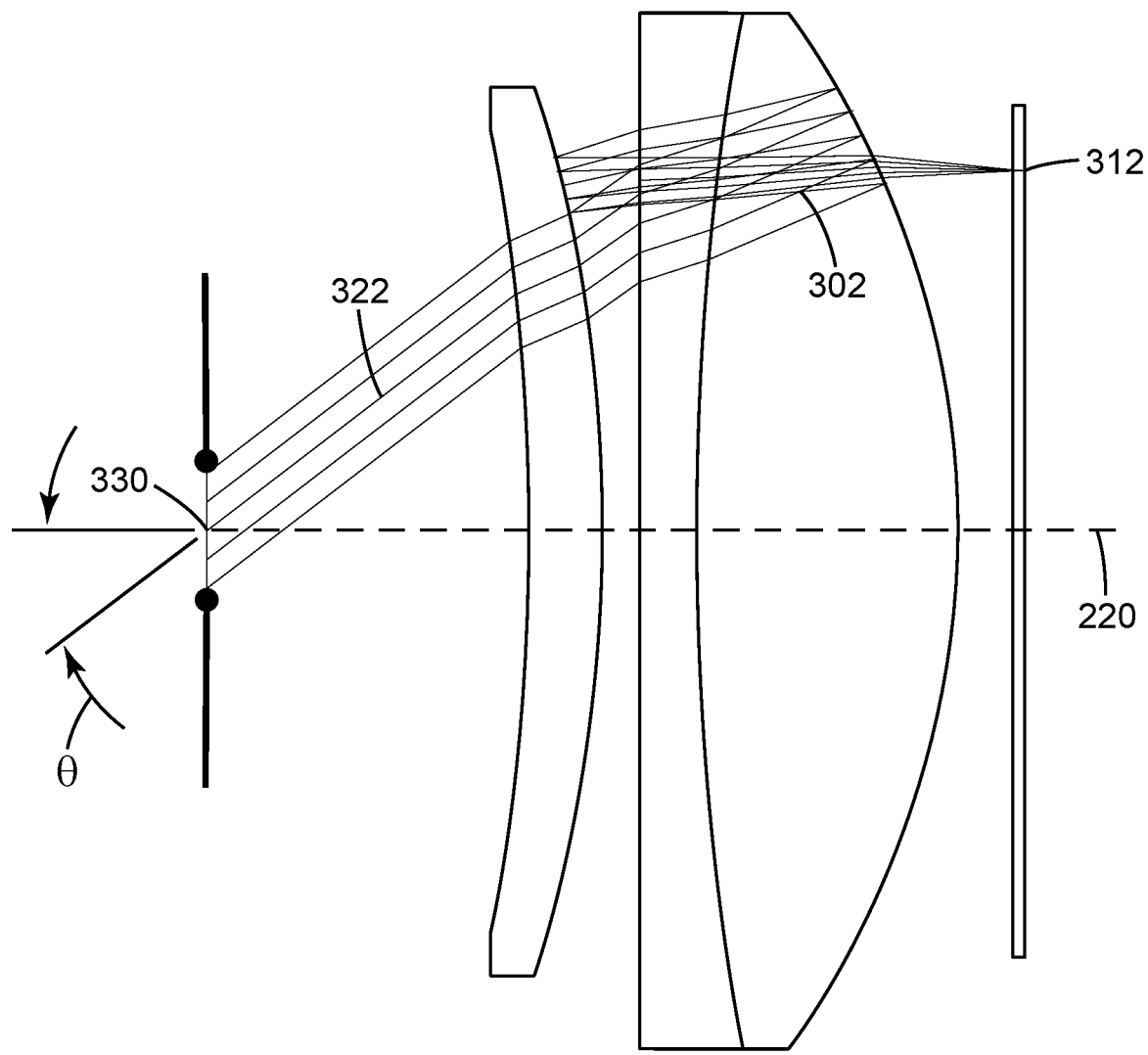
FIG. 6 shows an optical system in which a chief ray of the cone of light from an object passes through the center of the opening of the exit pupil and makes an angle of about 45 degrees with the optical axis.

Referring to FIG. 6, a cone of light 302 is incident on the optical system 200 from an object 312 may comprise a spatial frequency of about 70 line pairs per millimeter. The cone of light 302 fills the opening 111 of the exit pupil 110. A chief ray 322 of the cone of light 302 passes through the center 330 of the opening 110 of the exit pupil 111 and makes an angle (θ) of about 45 degrees with the optical axis 220. according to some embodiments, the modulation transfer function (MTF) of the optical system 200 may be greater than about 0.1, or greater that about 0.15, or even greater than 0.2.

A cone of light 302 is incident on the optical system 200 from an object 312 may comprise a spatial frequency of about 60 line pairs per millimeter. The cone of light 302 fills the opening 111 of the exit pupil 110. A chief ray 322 of the cone of light 302 passes through the center 330 of the opening 110 of the exit pupil 111 and makes an angle (θ) of about 45 degrees with the optical axis 220. according to some embodiments, the modulation transfer function (MTF) of the optical system 200 may be greater than about 0.1, or greater that about 0.15, or even greater than 0.2.

A cone of light 302 is incident on the optical system 200 from an object 312 may comprise a spatial frequency of about 50 line pairs per millimeter. The cone of light 302 fills the opening 111 of the exit pupil 110. A chief ray 322 of the cone of light 302 passes through the center 330 of the opening 110 of the exit pupil 111 and makes an angle (θ) of about 45 degrees with the optical axis 220. according to some embodiments, the modulation transfer function (MTF) of the optical system 200 may be greater than about 0.1, or greater that about 0.15, or even greater than 0.2.

A cone of light 302 is incident on the optical system 200 from an object 312 may comprise a spatial frequency of about 40 line pairs per millimeter. The cone of light 302 fills the opening 111 of the exit pupil 110. A chief ray 322 of the cone of light 302 passes through the center 330 of the opening 110 of the exit pupil 111 and makes an angle (θ) of about 45 degrees with the optical axis 220. according to some embodiments, the modulation transfer function (MTF) of the optical system 200 may be greater than about 0.1, or greater that about 0.15, or even greater than 0.2.

A cone of light 302 is incident on the optical system 200 from an object 312 may comprise a spatial frequency of about 30 line pairs per millimeter. The cone of light 302 fills the opening 111 of the exit pupil 110. A chief ray 322 of the cone of light 302 passes through the center 330 of the opening 110 of the exit pupil 111 and makes an angle (θ) of about 45 degrees with the optical axis 220. according to some embodiments, the modulation transfer function (MTF) of the optical system 200 may be greater than about 0.1, or greater that about 0.15, or even greater than 0.2.

Figure 7:
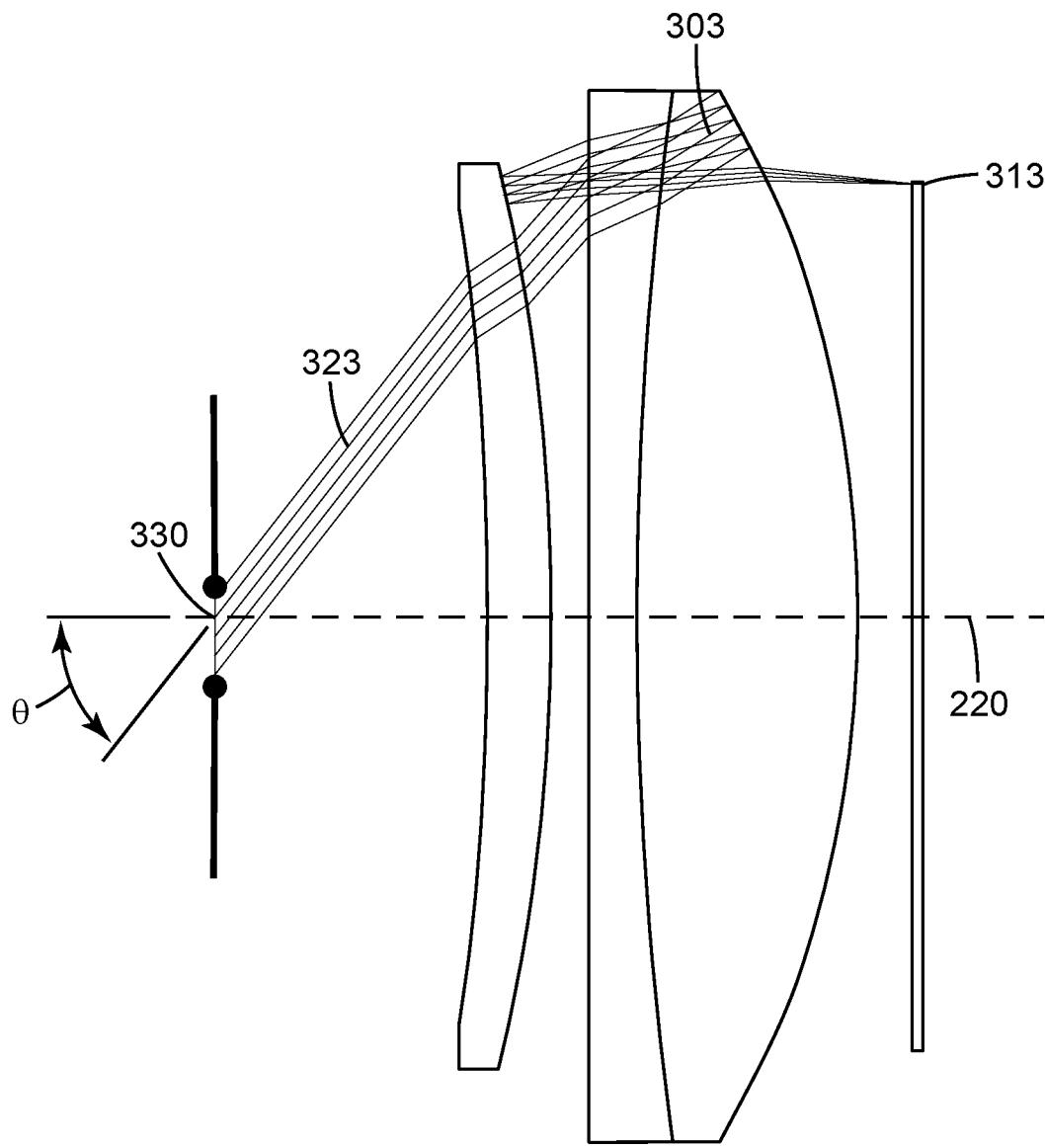
FIG. 7 shows an optical system in which a chief ray of the cone of light from an object passes through the center of the opening of the exit pupil and makes an angle of about 55 degrees with the optical axis.

Referring to FIG. 7, a cone of light 303 is incident on the optical system 200 from an object 313 may comprise a spatial frequency of about 70 line pairs per millimeter. The cone of light 303 fills the opening 111 of the exit pupil 110. A chief ray 323 of the cone of light 303 passes through the center 330 of the opening 110 of the exit pupil 111 and makes an angle (θ) of about 55 degrees with the optical axis 220. According to some embodiments, the modulation transfer function (MTF) of the optical system 200 may be greater than about 0.1, or greater that about 0.15.

A cone of light 303 is incident on the optical system 200 from an object 313 may comprise a spatial frequency of about 60 line pairs per millimeter. The cone of light 303 fills the opening 111 of the exit pupil 110. A chief ray 323 of the cone of light 303 passes through the center 330 of the opening 110 of the exit pupil 111 and makes an angle (θ) of about 55 degrees with the optical axis 220. According to some embodiments, the modulation transfer function (MTF) of the optical system 200 may be greater than about 0.1, or greater that about 0.15.

A cone of light 303 is incident on the optical system 200 from an object 313 may comprise a spatial frequency of about 50 line pairs per millimeter. The cone of light 303 fills the opening 111 of the exit pupil 110. A chief ray 323 of the cone of light 303 passes through the center 330 of the opening 110 of the exit pupil 111 and makes an angle (θ) of about 45 degrees with the optical axis 220. According to some embodiments, the modulation transfer function (MTF) of the optical system 200 may be greater than about 0.1, or greater that about 0.15.

A cone of light 303 is incident on the optical system 200 from an object 313 may comprise a spatial frequency of about 40 line pairs per millimeter. The cone of light 303 fills the opening 111 of the exit pupil 110. A chief ray 323 of the cone of light 303 passes through the center 330 of the opening 110 of the exit pupil 111 and makes an angle (θ) of about 55 degrees with the optical axis 220. According to some embodiments, the modulation transfer function (MTF) of the optical system 200 may be greater than about 0.1, or greater that about 0.15.

A cone of light 303 is incident on the optical system 200 from an object 313 may comprise a spatial frequency of about 30 line pairs per millimeter. The cone of light 303 fills the opening 111 of the exit pupil 110. A chief ray 323 of the cone of light 303 passes through the center 330 of the opening 110 of the exit pupil 111 and makes an angle (θ) of about 55 degrees with the optical axis 220. According to some embodiments, the modulation transfer function (MTF) of the optical system 200 may be greater than about 0.1, or greater that about 0.15.

Figure 8:
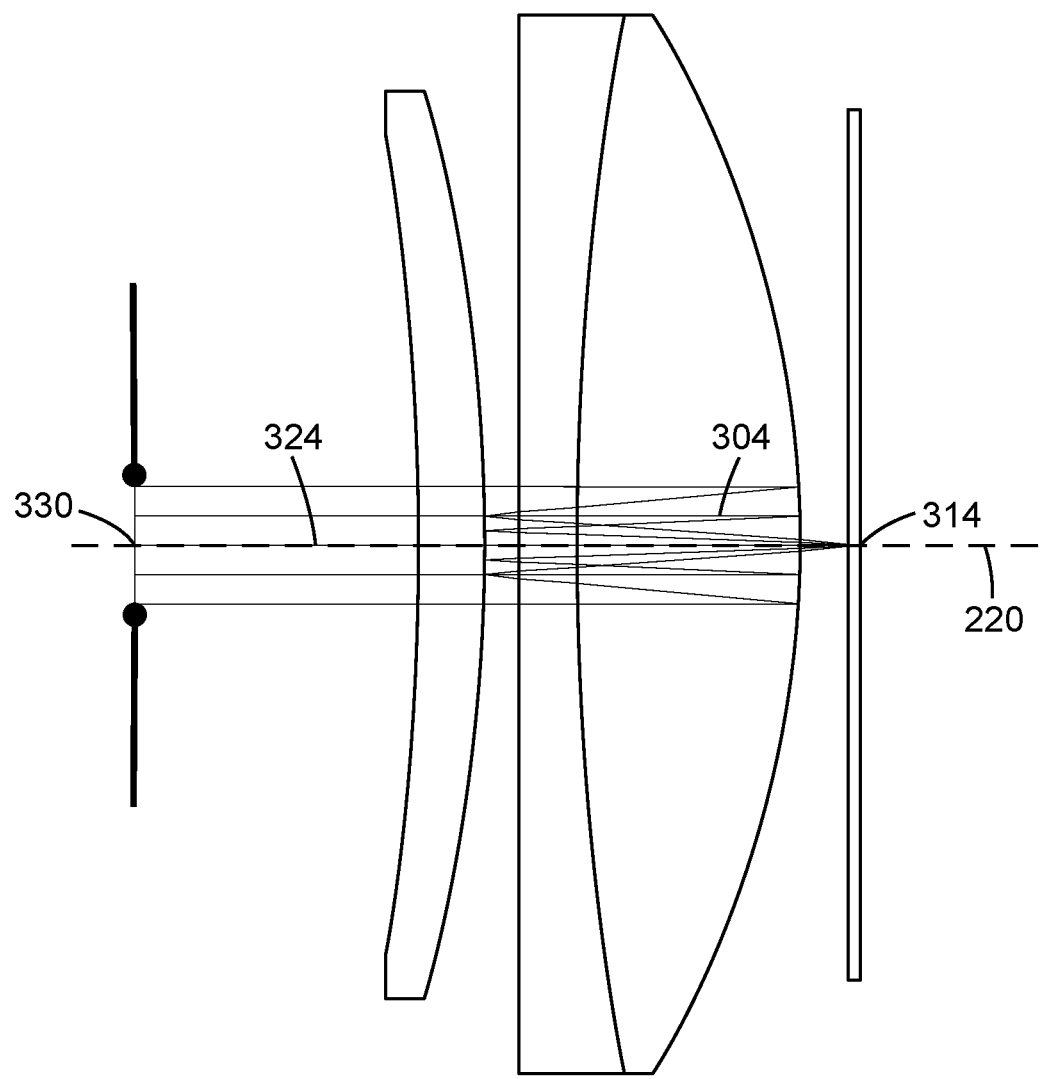
FIG. 8 shows an optical system in which a chief ray of the cone of light from an object passes through the center of the opening of the exit pupil and makes an angle of about zero degrees with the optical axis.

Referring to FIG. 8, a cone of light 304 is incident on the optical system 200 from an object 314 may comprise a spatial frequency of about 70 line pairs per millimeter. The cone of light 304 fills the opening 111 of the exit pupil 110. A chief ray 324 of the cone of light 304 passes through the center 330 of the opening 110 of the exit pupil 111 and makes an angle (θ) of about 0 degrees with the optical axis 220. According to some embodiments, the modulation transfer function (MTF) of the optical system 200 may be greater than about 0.5, greater that about 0.6, or even greater than about 0.68.

A cone of light 304 is incident on the optical system 200 from an object 314 may comprise a spatial frequency of about 60 line pairs per millimeter. The cone of light 304 fills the opening 111 of the exit pupil 110. A chief ray 324 of the cone of light 304 passes through the center 330 of the opening 110 of the exit pupil 111 and makes an angle (θ) of about 0 degrees with the optical axis 220. According to some embodiments, the modulation transfer function (MTF) of the optical system 200 may be greater than about 0.5, greater that about 0.6, or even greater than about 0.68.

A cone of light 304 is incident on the optical system 200 from an object 314 may comprise a spatial frequency of about 50 line pairs per millimeter. The cone of light 304 fills the opening 111 of the exit pupil 110. A chief ray 324 of the cone of light 304 passes through the center 330 of the opening 110 of the exit pupil 111 and makes an angle (θ) of about 0 degrees with the optical axis 220. According to some embodiments, the modulation transfer function (MTF) of the optical system 200 may be greater than about 0.5, greater that about 0.6, or even greater than about 0.68.

A cone of light 304 is incident on the optical system 200 from an object 314 may comprise a spatial frequency of about 40 line pairs per millimeter. The cone of light 304 fills the opening 111 of the exit pupil 110. A chief ray 324 of the cone of light 304 passes through the center 330 of the opening 110 of the exit pupil 111 and makes an angle (θ) of about 0 degrees with the optical axis 220. According to some embodiments, the modulation transfer function (MTF) of the optical system 200 may be greater than about 0.5, greater that about 0.6, or even greater than about 0.68.

A cone of light 304 is incident on the optical system 200 from an object 314 may comprise a spatial frequency of about 30 line pairs per millimeter. The cone of light 304 fills the opening 111 of the exit pupil 110. A chief ray 324 of the cone of light 304 passes through the center 330 of the opening 110 of the exit pupil 111 and makes an angle (θ) of about 0 degrees with the optical axis 220. According to some embodiments, the modulation transfer function (MTF) of the optical system 200 may be greater than about 0.5, greater that about 0.6, or even greater than about 0.68.

In the optical systems shown in FIGS. 1A-1D and 4-8, the plurality of optical lenses can include two lenses 20, 30 comprising a glass and a lens 40 comprising a plastic. Each first lens 20, 30 can have an optical birefringence less than about 10 nm/cm, and each second lens 40 can have an optical birefringence greater than about 10 nm/cm in some implementations.

In some embodiments, lenses 20, 30 may form a doublet. According to this embodiment, a first major surface 31 of one first lens 30 may substantially conform to and be bonded to a major surface 22 of the other first lens 20.

Referring again to FIG. 1A, some embodiments are directed to an optical system 200 for displaying an image 11 to a viewer 210, wherein the system 200 includes an imager 10 emitting an image 11. The system 200 includes an exit pupil 110 defining an opening 111 therein. The image 11 emitted by the imager 10 exits the optical system 200 through the opening 111 of the exit pupil 110. A plurality of optical lenses, for example, first 20, second 30, and third 40 optical lenses, are disposed between the imager 10 and the exit pupil 110. The plurality of optical lenses 20, 30, 40 receives the emitted image 11 from the imager 10. The third lens 40 may have an optical birefringence greater than about 10 nm/cm. The first 20 and second 30 lenses may each have an optical birefringence less than about 7 nm/cm. The first 20 and second 30 lenses are bonded to each other to form a doublet.

The system 200 includes a partial reflector 50 disposed on and conforming to a curved major surface 21 of the doublet 20, 30. The partial reflector 50 can have an average optical reflectance of at least 30% in a predetermined wavelength range.

The system 200 includes a reflective polarizer 60 disposed on and conforming to a curved major surface 41 of the third lens 40. The reflective polarizer 60 substantially reflects light having a first polarization state and substantially transmits light having an orthogonal second polarization state in the predetermined wavelength range.

A first retarder layer 70 is disposed on and conforms to a major surface 32 of the doublet 20, 30.

With reference to FIG. 5, a cone of light 301 from an image 11 that is emitted by the imager 10 may comprise a spatial frequency of about 70 line pairs per millimeter. The image fills the exit pupil 111. A chief ray 321 of the cone 301 of light passes through a center 330 of the opening 111 of the exit pupil 110 and makes an angle of about 40 degrees with an optical axis 220 of the optical system 200. The modulation transfer function (MTF) of the optical system 200 may be greater than about 0.15, for example. Other configurations, such as those discussed in connection with FIGS. 4 and 6-8 are also possible.

Embodiments disclosed herein include:

Embodiment 1. An optical system for displaying an image to a viewer comprising:
- a plurality of optical lenses comprising first, second, and third optical lenses, the second lens disposed between the first and third lenses, each of the first and second lenses having an optical birefringence less than about 20 nm/cm, the third lens having an optical birefringence greater than about 10 nm/cm, each lens having opposing first and second major surfaces,
  the first and second major surfaces of the first lens substantially spherical and concave toward each other, the first major surface having a radius of curvature in a range from about 10 mm to about 500 mm, the second major surface having a radius of curvature in a range from about 16 mm to about 1500 mm,
  the first major surface of the second lens substantially spherical, adjacent to and concave toward the second major surface of the first lens, and having a radius of curvature greater than about 16 mm to about 1500 mm,
  the first major surface of the third lens adjacent to and convex toward the second major surface of the second lens, and having a radius of curvature in a range from about 14 mm to about 800 mm, the second major surface of the third lens convex toward the first major surface of the third lens, and having a radius of curvature in a range from about 18 mm to about 1300 mm;
- a partial reflector having an average optical reflectance of at least 30% in a predetermined wavelength range;
- a reflective polarizer substantially reflecting light having a first polarization state and substantially transmitting light having an orthogonal second polarization state in the predetermined wavelength range; and
- a first retarder layer disposed on and conforming to the substantially flat second major surface of the second lens.

Embodiment 2. The optical system of embodiment 1, wherein:
the partial reflector is disposed on and conforms to the first curved major surface of the first lens; and
the reflective polarizer is disposed on and conforms to the first major surface of the third lens.

Embodiment 3. The optical system of embodiment 1, wherein the reflective polarizer is disposed on and conforms to the first major surface of the first lens.

Embodiment 4. The optical system of embodiment 1, wherein the partial reflector comprises a half mirror that is disposed on and conforms to the first major surface of the third lens.

Embodiment 5. The optical system of any of embodiments 1 through 4, wherein each of the first and second lenses has an optical birefringence less than about 15 nm/cm.

Embodiment 6. The optical system of any of embodiments 1 through 4, wherein each of the first and second lenses has an optical birefringence less than about 10 nm/cm.

Embodiment 7. The optical system of any of embodiments 1 through 4, wherein each of the first and second lenses has an optical birefringence less than about 7 nm/cm.

Embodiment 8. The optical system of any of embodiments 1 through 4, wherein each of the first and second lenses has an optical birefringence less than about 5 nm/cm.

Embodiment 9. The optical system of any of embodiments 1 through 4, wherein the third lens has an optical birefringence greater than about 15 nm/cm.

Embodiment 10. The optical system of any of embodiments 1 through 4, wherein the third lens has an optical birefringence greater than about 20 nm/cm.

Embodiment 11. The optical system of any of embodiments 1 through 10, wherein the second major surface of the second lens has a radius of curvature greater than about 2000

Embodiment 12. The optical system of any of embodiments 1 through 10, wherein the second major surface of the second lens is substantially flat.

Embodiment 13. The optical system of any of embodiments 1 through 10, wherein the second major surface of the second lens has a radius of curvature greater than about 100.

Embodiment 14. The optical system of any of embodiments 1 through 13, wherein the predetermined wavelength range comprises a wavelength of about 550 nm.

Embodiment 15. The optical system of any of embodiments 1 through 13, wherein the predetermined wavelength range comprises 587.6 nm.

Embodiment 16. The optical system of any of embodiments 1 through 13, wherein the predetermined wavelength range is from about 400 nm to about 700 nm.

Embodiment 17. The optical system of any of embodiments 1 through 13, wherein the predetermined wavelength comprises a blue primary color wavelength, a green primary color wavelength and a red primary color wavelength.

Embodiment 18. The optical system of any of embodiments 1 through 17, wherein the first and second lenses each comprises a glass.

Embodiment 19. The optical system of embodiment 18, wherein the glass comprises one or more of a borosilicate BK7 glass, a lanthanum crown LAK34, a lanthanum flint LAF7 glass, a flint F2 glass, a dense flint SF2, a lanthanum dense flint LASF45, a fluorophosphate FPL51 and a fluorophosphate FPL55 glass.

Embodiment 20. The optical system of any of embodiments 1 through 17, wherein the first lens has an index of refraction of about 1.52 and the second lens has an index of refraction of about 1.62 at about 550 nm.

Embodiment 21. The optical system of any of embodiments 1 through 17, wherein the first lens has an index of refraction of about 1.52 and the second lens has an index of refraction of about 1.62 at 587.6 nm.

Embodiment 22. The optical system of any of embodiments 1 through 17, wherein the first lens has an index of refraction of about 1.44 and the second lens has an index of refraction of about 1.75 at about 500 nm.

Embodiment 23. The optical system of any of embodiments 1 through 17, wherein the first lens has an index of refraction of about 1.44 and the second lens has an index of refraction of about 1.75 at 587.6 nm.

Embodiment 24. The optical system of claim 1, wherein the first lens comprises a borosilicate BK7 glass having an index of refraction of about 1.52 at 587.6 nm, and the second lens comprises a flint F2 glass having an index of refraction of about 1.62 at 587.6 nm.

Embodiment 25. The optical system of any of embodiments 1 through 17, wherein the first lens comprises a borosilicate BK7 glass having an index of refraction of about 1.52 at about 587.6 nm, and the second lens comprises a dense flint SF2 glass having an index of refraction of about 1.65 at about 587.6 nm.

Embodiment 26. The optical system of any of embodiments 1 through 17, wherein the first lens comprises a fluorophosphate FPL51 glass having an index of refraction of about 1.50 at about 587.6 nm, and the second lens comprises a lanthanum dense flint LASF45 glass having an index of refraction of about 1.80 at about 587.6 nm.

Embodiment 27. The optical system of any of embodiments 1 through 17, wherein the first lens comprises a fluorophosphate FPL51 glass having an index of refraction of about 1.50 at about 587.6 nm, and the second lens comprises a lanthanum crown LAK34 glass having an index of refraction of about 1.73 at about 587.6 nm.

Embodiment 28. The optical system of any of embodiments 1 through 17, wherein the first lens comprises a fluorophosphate FPL51 glass having an index of refraction of about 1.50 at about 587.6 nm, and the second lens comprises a lanthanum crown LAK33B glass having an index of refraction of about 1.76 at about 587.6 nm.

Embodiment 29. The optical system of any of embodiments 1 through 17, wherein the first lens comprises a fluorophosphate FPL51 glass having an index of refraction of about 1.50 at about 587.6 nm, and the second lens comprises a lanthanum crown LAK33A glass having an index of refraction of about 1.75 at about 587.6 nm.

Embodiment 30. The optical system of any of embodiments 1 through 17, wherein the first lens comprises a fluorophosphate FPL55 glass having an index of refraction of about 1.44 at about 587.6 nm, and the second lens comprises a lanthanum crown LAK34 glass having an index of refraction of about 1.73 at about 587.6 nm.

Embodiment 31. The optical system of any of embodiments 1 through 17, wherein the first lens comprises a fluorophosphate FPL51 glass having an index of refraction of about 1.50 at about 587.6 nm, and the second lens comprises a lanthanum crown LAF7 glass having an index of refraction of about 1.75 at about 587.6 nm.

Embodiment 32. The optical system of any of embodiments 1 through 17, wherein the first lens comprises a fluorophosphate FPL55 glass having an index of refraction of about 1.44 at about 587.6 nm, and the second lens comprises a lanthanum flint LAK34 glass having an index of refraction of about 1.73 at about 587.6 nm.

Embodiment 33. The optical system of any of embodiments 1 through 17, wherein the first lens comprises a fluorophosphate FPL55 glass having an index of refraction of about 1.44 at about 587.6 nm, and the second lens comprises a lanthanum flint LAF7 glass having an index of refraction of about 1.75 at about 587.6 nm.

Embodiment 34. The optical system of any of embodiments 1 through 33, wherein the third lens comprises a plastic.

Embodiment 35. The optical system of embodiment 34, wherein the plastic comprises one or more of a polymethylmethacrylate (PMMA), a polystyrene, a polyvinyl alcohol, and a polycarbonate.

Embodiment 36. The optical system of any of embodiments 1 through 35, wherein the third lens has an index of refraction of about 1.49 at about 550 nm.

Embodiment 37. The optical system of any of embodiments 1 through 35, wherein the third lens has an index of refraction of about 1.49 at about 587.6 nm.

Embodiment 38. The optical system of any of embodiments 1 through 35, wherein the third lens comprises polymethylmethacrylate (PMMA) having an index of refraction of about 1.49 at about 550 nm.

Embodiment 39. The optical system of any of embodiments 1 through 35, wherein the third lens comprises polymethylmethacrylate (PMMA) having an index of refraction of about 1.49 at 587.6 nm.

Embodiment 40. The optical system of any of embodiments 1 through 39, wherein the radius of curvature of the first major surface of the second lens is substantially equal to the radius of curvature of the second major surface of the first lens.

Embodiment 41. The optical system of any of embodiments 1 through 40, wherein the first major surface of the second lens is bonded to the second major surface of the first lens.

Embodiment 42. The optical system of any of embodiments 1 through 41, wherein the first major surface of the second lens is bonded to the second major surface of the first lens via an optical adhesive.

Embodiment 43. The optical system of any of embodiments 1 through 42, further comprising an optical axis, such that a light ray propagating along the optical axis passes through the plurality of optical lenses, the partial reflector, the reflective polarizer, and the first retarder layer without being substantially refracted.

Embodiment 44. The optical system of any of embodiments 1 through 43, wherein at least one of the plurality of optical lenses, the partial reflector, the reflective polarizer, and the first retarder layer is rotationally symmetric.

Embodiment 45. The optical system of any of embodiments 1 through 43, wherein at least one of the plurality of optical lenses, the partial reflector, the reflective polarizer, and the first retarder layer is non-rotationally symmetric.

Embodiment 46. The optical system of any of embodiments 1 through 43, wherein at least one of the plurality of optical lenses, the partial reflector, the reflective polarizer, and the first retarder layer has at least one plane of symmetry.

Embodiment 47. The optical system of any of embodiments 1 through 46, wherein the first retarder layer is substantially a quarter wave retarder at at least one wavelength in the predetermined wavelength range.

Embodiment 48. The optical system of any of embodiments 1 through 47, wherein the first lens is configured to receive an image from an imager, the image incident on the first lens being elliptically polarized.

Embodiment 49. The optical system of any of embodiments 1 through 47, wherein the first lens is configured to receive an image from an imager, the image incident on the first lens being circularly polarized.

Embodiment 50. The optical system of any of embodiments 1 through 49 further comprising a second retarder layer, the first lens disposed between the second lens and the second retarder layer.

Embodiment 51. The optical system of embodiment 50 further comprising a first linear absorbing polarizer, the second retarder layer disposed between the first lens and the first linear absorbing polarizer.

Embodiment 52. The optical system of any of embodiments 1 through 51 further comprising a linear absorbing polarizer, the third lens disposed between the linear absorbing polarizer and the reflective polarizer.

Embodiment 53. The optical system of any of embodiments 1 through 52 further comprising:
    a second retarder layer, the first lens disposed between the second lens and the second retarder layer;
    a first linear absorbing polarizer, the second retarder layer disposed between the first lens and the first linear absorbing polarizer; and a second linear absorbing polarizer, the third lens disposed between the second linear absorbing polarizer and the reflective polarizer.

Embodiment 54. The optical system of any of embodiments 1 through 53, further comprising:
an exit pupil defining an opening therein;
a second retarder layer disposed between the exit pupil and the third lens;
a first linear absorbing polarizer disposed between the second retarder layer and the third lens.

Embodiment 55. The optical system of embodiment 54, further comprising:
an imager facing the first lens, the imager emitting an image; and
a second linear absorbing polarizer disposed between the imager and the first lens.

Embodiment 56. The optical system of any of embodiments 1 through 55, further comprising an exit pupil disposed adjacent and facing the third lens and defining an opening therein, wherein there is no linear absorbing polarizer between the third lens and the exit pupil.

Embodiment 57. The optical system of any of embodiments 1 through 56, further comprising:
an imager disposed adjacent and facing the first lens, the imager emitting an image, the image incident on the first lens being elliptically polarized; and
an exit pupil disposed adjacent and facing the third lens and defining an opening therein, the image incident on the first lens exiting the optical system through the opening of the exit pupil, the exiting image being substantially linearly polarized.

Embodiment 58. The optical system of embodiment 57, wherein the imager is substantially a polygon and the opening of the exit pupil is substantially circular.

Embodiment 59. The optical system of embodiment 57, wherein a maximum lateral dimension of an active region of the imager is D and a maximum lateral dimension of the opening of the exit pupil is d, $1 \leq D/d \leq 20$.

Embodiment 60. The optical system of embodiment 59, wherein $2 \leq D/d \leq 15$.

Embodiment 61. The optical system of embodiment 59, wherein $5 \leq D/d \leq 10$.

Embodiment 62. The optical system of embodiment 59, wherein a maximum lateral dimension of the opening of the exit pupil is in a range from about 2 mm to about 80 mm.

Embodiment 63. The optical system of embodiment 57, wherein a separation between the exit pupil and the third less is in a range from about 5 mm to about 30 mm.

Embodiment 64. The optical system of embodiment 57, wherein a separation between the exit pupil and the third less is in a range from about 10 mm to about 20 mm.

Embodiment 65. An optical system for displaying an image to a viewer comprising:
a plurality of optical lenses comprising at least one first lens comprising a glass and at least one second lens comprising a plastic;
a partial reflector disposed on and conforming to a curved major surface of the at least one first lens and having an average optical reflectance of at least 30% in a predetermined wavelength range;
a reflective polarizer disposed on and conforming to a curved major surface of the at least one second lens, the reflective polarizer substantially reflecting light having a first polarization state and substantially transmitting light having an orthogonal second polarization state in the predetermined wavelength range;
a first retarder layer disposed on and conforming to a major surface of plurality of optical lenses between the reflective polarizer and the partial reflector; and
an exit pupil defining an opening therein,
the optical system having an optical axis, a light ray propagating along the optical axis passing through the plurality of optical lenses, the partial reflector, the reflective polarizer, and the first retarder layer without being substantially refracted, such that for a cone of light incident on the optical system from an object comprising a spatial frequency of about 70 line pairs per millimeter filling the exit pupil with a chief ray of the cone of light passing through a center of the opening of the exit pupil and making an angle ($\theta$) of about 20 degrees with the optical axis, a modulation transfer function (MTF) of the optical system is greater than about 0.2.

Embodiment 66. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 20 degrees with the optical axis, a modulation transfer function (MTF) of the optical system is greater than about 0.25.

Embodiment 67. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 20 degrees with the optical axis, a modulation transfer function (MTF) of the optical system is about 0.3.

Embodiment 68. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.1.

Embodiment 69. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.15.

Embodiment 70. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 40 degrees with the optical axis, a modulation transfer function (MTF) of the optical system is about 0.2.

Embodiment 71. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 45 degrees with the optical axis, a modulation transfer function (MTF) of the optical system is greater than about 0.1.

Embodiment 72. The optical system of embodiment 65, wherein for a cone of light incident on the optical system from an object comprising a spatial frequency of about 70 line pairs per millimeter filling the exit pupil with a chief ray of the cone of light passing through a center of the opening of the exit pupil and making an angle of about 45 degrees with the optical axis, a modulation transfer function (MTF) of the optical system is greater than about 0.15.

Embodiment 73. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 45 degrees with the optical axis, a modulation transfer function (MTF) of the optical system is about 0.2.

Embodiment 74. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 55 degrees with the optical axis, a modulation transfer function (MTF) of the optical system is greater than about 0.1.

Embodiment 75. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about 55 degrees with the optical axis, a modulation transfer function (MTF) of the optical system is about 0.15.

Embodiment 76. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.5.

Embodiment 77. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.6.

Embodiment 78. The optical system of embodiment 65, wherein for a cone of light incident on the optical system from an object comprising a spatial frequency of about 70 line pairs per millimeter filling the exit pupil with a chief ray of the cone of light passing through the center of the opening of the exit pupil and making an angle of about zero degree with the optical axis, a modulation transfer function (MTF) of the optical system is about 0.68.

Embodiment 79. The optical system of embodiment 65, wherein the plurality of optical lenses comprises two first lenses each comprising a glass and one second lens comprising a plastic.

Embodiment 80. The optical system of embodiment 79, wherein the two first lenses form a doublet, a major surface of one first lens substantially conforming to and bonded to a major surface of the other first lens.

Embodiment 81. The optical system of embodiment 65, wherein each first lens has an optical birefringence less than about 10 nm/cm, and each second lens has an optical birefringence greater than about 10 nm/cm.

Embodiment 82. An optical system for displaying an image to a viewer comprising:
 a plurality of optical lenses comprising at least one first lens comprising a glass and at least one second lens comprising a plastic;
 a partial reflector disposed on and conforming to a curved major surface of the at least one first lens and having an average optical reflectance of at least 30% in a predetermined wavelength range;
 a reflective polarizer disposed on and conforming to a curved major surface of the at least one second lens, the reflective polarizer substantially reflecting light having a first polarization state and substantially transmitting light having an orthogonal second polarization state in the predetermined wavelength range;
 a first retarder layer disposed on and conforming to a major surface of plurality of optical lenses between the reflective polarizer and the partial reflector; and
 an exit pupil defining an opening therein,
 the optical system having an optical axis, a light ray propagating along the optical axis passing through the plurality of optical lenses, the partial reflector, the reflective polarizer, and the first retarder layer without being substantially refracted, such that for a cone of light incident on the optical system from an object comprising a spatial frequency of about 60 line pairs per millimeter filling the exit pupil with a chief ray of the cone of light passing through a center of the opening of the exit pupil and making an angle ($\theta$) of about 20 degrees with the optical axis, a modulation transfer function (MTF) of the optical system is greater than about 0.2.

Embodiment 83. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 20 degrees with the optical axis, a modulation transfer function (MTF) of the optical system is greater than about 0.25.

Embodiment 84. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 20 degrees with the optical axis, a modulation transfer function (MTF) of the optical system is about 0.3.

Embodiment 85. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.1.

Embodiment 86. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.15.

Embodiment 87. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 40 degrees with the optical axis, a modulation transfer function (MTF) of the optical system is about 0.2.

Embodiment 88. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 45 degrees with the optical axis, a modulation transfer function (MTF) of the optical system is greater than about 0.1.

Embodiment 89. The optical system of embodiment 82, wherein for a cone of light incident on the optical system from an object comprising a spatial frequency of about 60 line pairs per millimeter filling the exit pupil with a chief ray of the cone of light passing through a center of the opening of the exit pupil and making an angle of about 45 degrees with the optical axis, a modulation transfer function (MTF) of the optical system is greater than about 0.15.

Embodiment 90. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 45 degrees with the optical axis, a modulation transfer function (MTF) of the optical system is about 0.2.

Embodiment 91. The optical system of embodiment 82, wherein for a cone of light (303) incident on the optical system from an object comprising a spatial frequency of about 60 line pairs per millimeter filling the exit pupil with a chief ray of the cone of light passing through the center of the opening of the exit pupil and making an angle of about 55 degrees with the optical axis, a modulation transfer function (MTF) of the optical system is greater than about 0.1.

Embodiment 92. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about 55 degrees with the optical axis, a modulation transfer function (MTF) of the optical system is about 0.15.

Embodiment 93. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.5.

Embodiment 94. The optical system of embodiment 82, wherein for a cone of light incident on the optical system from an object comprising a spatial frequency of about 60 line pairs per millimeter filling the exit pupil with a chief ray of the cone of light passing through the center Embodiment of the opening of the exit pupil and making an angle of about zero degree with the optical axis, a modulation transfer function (MTF) of the optical system is greater than about 0.6.

Embodiment 95. The optical system of embodiment 82, wherein for a cone of light incident on the optical system from an object comprising a spatial frequency of about 60 line pairs per millimeter filling the exit pupil with a chief ray of the cone of light passing through the center of the opening of the exit pupil and making an angle of about zero degree with the optical axis, a modulation transfer function (MTF) of the optical system is about 0.68.

Embodiment 96. The optical system of embodiment 82, wherein the plurality of optical lenses comprises two first lenses each comprising a glass and one second lens comprising a plastic.

Embodiment 97. The optical system of embodiment 96, wherein the two first lenses form a doublet, a major surface of one first lens substantially conforming to and bonded to a major surface of the other first lens.

Embodiment 98. The optical system of embodiment 82, wherein each first lens has an optical birefringence less than about 10 nm/cm, and each second lens has an optical birefringence greater than about 10 nm/cm.

Embodiment 99. An optical system for displaying an image to a viewer, comprising:
 a plurality of optical lenses comprising at least one first lens comprising a glass and at least one second lens comprising a plastic;
 a partial reflector disposed on and conforming to a curved major surface of the at least one first lens and having an average optical reflectance of at least 30% in a predetermined wavelength range;
 a reflective polarizer disposed on and conforming to a curved major surface of the at least one second lens, the reflective polarizer substantially reflecting light having a first polarization state and substantially transmitting light having an orthogonal second polarization state in the predetermined wavelength range;
 a first retarder layer disposed on and conforming to a major surface of plurality of optical lenses between the reflective polarizer and the partial reflector; and
 an exit pupil defining an opening therein,
 the optical system having an optical axis, a light ray propagating along the optical axis passing through the plurality of optical lenses, the partial reflector, the reflective polarizer, and the first retarder layer without being substantially refracted, such that for a cone of light incident on the optical system from an object comprising a spatial frequency of about 50 line pairs per millimeter filling the exit pupil with a chief ray of the cone of light passing through a center of the opening of the exit pupil and making an angle ($\theta$) of about 20 degrees with the optical axis, a modulation transfer function (MTF) of the optical system is greater than about 0.2.

Embodiment 100. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 20 degrees with the optical axis, a modulation transfer function (MTF) of the optical system is greater than about 0.25.

Embodiment 101. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 20 degrees with the optical axis, a modulation transfer function (MTF) of the optical system is about 0.3.

Embodiment 102. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.1.

Embodiment 103. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.15.

Embodiment 104. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 40 degrees with the optical axis, a modulation transfer function (MTF) of the optical system is about 0.2.

Embodiment 105. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 45 degrees with the optical axis, a modulation transfer function (MTF) of the optical system is greater than about 0.1.

Embodiment 106. The optical system of embodiment 99, wherein for a cone of light incident on the optical system from an object comprising a spatial frequency of about 50 line pairs per millimeter filling the exit pupil with a chief ray of the cone of light passing through a center of the opening of the exit pupil and making an angle of about 45 degrees with the optical axis, a modulation transfer function (MTF) of the optical system is greater than about 0.15.

Embodiment 107. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 45 degrees with the optical axis, a modulation transfer function (MTF) of the optical system is about 0.2.

Embodiment 108. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 55 degrees with the optical axis, a modulation transfer function (MTF) of the optical system is greater than about 0.1.

Embodiment 109. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about 55 degrees with the optical axis, a modulation transfer function (MTF) of the optical system is about 0.15.

Embodiment 110. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.5.

Embodiment 111. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.6.

Embodiment 112. The optical system of embodiment 99, wherein for a cone of light incident on the optical system from an object comprising a spatial frequency of about 50 line pairs per millimeter filling the exit pupil with a chief ray of the cone of light passing through the center of the opening of the exit pupil and making an angle of about zero degree with the optical axis, a modulation transfer function (MTF) of the optical system is about 0.68.

Embodiment 113. The optical system of embodiment 99, wherein the plurality of optical lenses comprises two first lenses each comprising a glass and one second lens comprising a plastic.

Embodiment 114. The optical system of embodiment 113, wherein the two first lenses form a doublet, a major surface of one first lens substantially conforming to and bonded to a major surface of the other first lens.

Embodiment 115. The optical system of embodiment 99, wherein each first lens has an optical birefringence less than about 10 nm/cm, and each second lens has an optical birefringence greater than about 10 nm/cm.

Embodiment 116. An optical system for displaying an image to a viewer comprising:

a plurality of optical lenses comprising at least one first lens comprising a glass and at least one second lens comprising a plastic;

a partial reflector disposed on and conforming to a curved major surface of the at least one first lens and having an average optical reflectance of at least 30% in a predetermined wavelength range;

a reflective polarizer disposed on and conforming to a curved major surface of the at least one second lens, the reflective polarizer substantially reflecting light having a first polarization state and substantially transmitting light having an orthogonal second polarization state in the predetermined wavelength range;

a first retarder layer disposed on and conforming to a major surface of plurality of optical lenses between the reflective polarizer and the partial reflector; and an exit pupil defining an opening therein, the optical system having an optical axis, a light ray propagating along the optical axis passing through the plurality of optical lenses, the partial reflector, the reflective polarizer, and the first retarder layer without being substantially refracted, such that for a cone of light incident on the optical system from an object comprising a spatial frequency of about 40 line pairs per millimeter filling the exit pupil with a chief ray of the cone of light passing through a center of the opening of the exit pupil and making an angle ($\theta$) of about 20 degrees with the optical axis, a modulation transfer function (MTF) of the optical system is greater than about 0.2.

Embodiment 117. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 20 degrees with the optical axis, a modulation transfer function (MTF) of the optical system is greater than about 0.25.

Embodiment 118. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 20 degrees with the optical axis, a modulation transfer function (MTF) of the optical system is about 0.3.

Embodiment 119. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.1.

Embodiment 120. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.15.

Embodiment 121. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 40 degrees with the optical axis, a modulation transfer function (MTF) of the optical system is about 0.2.

Embodiment 122. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 45 degrees with the optical axis, a modulation transfer function (MTF) of the optical system is greater than about 0.1.

Embodiment 123. The optical system of embodiment 116, wherein for a cone of light incident on the optical system from an object comprising a spatial frequency of about 40 line pairs per millimeter filling the exit pupil with a chief ray of the cone of light passing through a center of the opening of the exit pupil and making an angle of about 45 degrees with the optical axis, a modulation transfer function (MTF) of the optical system is greater than about 0.15.

Embodiment 124. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 45 degrees with the optical axis, a modulation transfer function (MTF) of the optical system is about 0.2.

Embodiment 125. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 55 degrees with the optical axis, a modulation transfer function (MTF) of the optical system is greater than about 0.1.

Embodiment 126. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about 55 degrees with the optical axis, a modulation transfer function (MTF) of the optical system is about 0.15.

Embodiment 127. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.5.

Embodiment 128. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.6.

Embodiment 129. The optical system of embodiment 116, wherein for a cone of light incident on the optical system from an object comprising a spatial frequency of about 40 line pairs per millimeter filling the exit pupil with a chief ray of the cone of light passing through the center of the opening of the exit pupil and making an angle of about zero degree with the optical axis, a modulation transfer function (MTF) of the optical system is about 0.68.

Embodiment 130. The optical system of embodiment 116, wherein the plurality of optical lenses comprises two first lenses (20, 30) each comprising a glass and one second lens comprising a plastic.

Embodiment 131. The optical system of embodiment 130, wherein the two first lenses form a doublet, a major surface of one first lens substantially conforming to and bonded to a major surface of the other first lens.

Embodiment 132. The optical system of embodiment 116, wherein each first lens has an optical birefringence less than about 10 nm/cm, and each second lens has an optical birefringence greater than about 10 nm/cm.

Embodiment 133. An optical system for displaying an image to a viewer comprising:
- a plurality of optical lenses comprising at least one first lens comprising a glass and at least one second lens comprising a plastic;
- a partial reflector disposed on and conforming to a curved major surface of the at least one first lens and having an average optical reflectance of at least 30% in a predetermined wavelength range;
- a reflective polarizer disposed on and conforming to a curved major surface of the at least one second lens, the reflective polarizer substantially reflecting light having a first polarization state and substantially transmitting light having an orthogonal second polarization state in the predetermined wavelength range;
- a first retarder layer disposed on and conforming to a major surface of plurality of optical lenses between the reflective polarizer and the partial reflector; and
- an exit pupil defining an opening therein,
- the optical system having an optical axis, a light ray propagating along the optical axis passing through the plurality of optical lenses, the partial reflector, the reflective polarizer, and the first retarder layer without being substantially refracted, such that for a cone of light incident on the optical system from an object comprising a spatial frequency of about 30 line pairs per millimeter filling the exit pupil with a chief ray of the cone of light passing through a center of the opening of the exit pupil and making an angle (θ) of about 20 degrees with the optical axis, a modulation transfer function (MTF) of the optical system is greater than about 0.2.

Embodiment 134. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 20 degrees with the optical axis, a modulation transfer function (MTF) of the optical system is greater than about 0.25.

Embodiment 135. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 20 degrees with the optical axis, a modulation transfer function (MTF) of the optical system is about 0.3.

Embodiment 136. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.1.

Embodiment 137. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 40 degrees with the optical axis, a modulation transfer function (MTF) of the optical system is greater than about 0.15.

Embodiment 138. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 40 degrees with the optical axis, a modulation transfer function (MTF) of the optical system is about 0.2.

Embodiment 139. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 45 degrees with the optical axis, a modulation transfer function (MTF) of the optical system is greater than about 0.1.

Embodiment 140. The optical system of embodiment 133, wherein for a cone of light incident on the optical system from an object comprising a spatial frequency of about 30 line pairs per millimeter filling the exit pupil with a chief ray of the cone of light passing through a center of the opening of the exit pupil and making an angle of about 45 degrees with the optical axis, a modulation transfer function (MTF) of the optical system is greater than about 0.15.

Embodiment 141. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 45 degrees with the optical axis, a modulation transfer function (MTF) of the optical system is about 0.2.

Embodiment 142. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 55 degrees with the optical axis, a modulation transfer function (MTF) of the optical system is greater than about 0.1.

Embodiment 143. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about 55 degrees with the optical axis, a modulation transfer function (MTF) of the optical system is about 0.15.

Embodiment 144. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.5.

Embodiment 145. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about zero degree with the optical axis, a modulation transfer function (MTF) of the optical system is greater than about 0.6.

Embodiment 146. The optical system of embodiment 133, wherein for a cone of light incident on the optical system from an object comprising a spatial frequency of about 30 line pairs per millimeter filling the exit pupil with a chief ray of the cone of light passing through the center of the opening of the exit pupil and making an angle of about zero degree with the optical axis, a modulation transfer function (MTF) of the optical system is about 0.68.

Embodiment 147. The optical system of embodiment 133, wherein the plurality of optical lenses comprises two first lenses each comprising a glass and one second lens comprising a plastic.

Embodiment 148. The optical system of embodiment 147, wherein the two first lenses form a doublet, a major surface of one first lens substantially conforming to and bonded to a major surface of the other first lens.

Embodiment 149. The optical system of embodiment 133, wherein each first lens has an optical birefringence less than about 10 nm/cm, and each second lens has an optical birefringence greater than about 10 nm/cm.

Embodiment 150. An optical system for displaying an image to a viewer comprising:
    an imager emitting an image;
    an exit pupil defining an opening therein, image emitted by the imager exiting the optical system through the opening of the exit pupil;
    a plurality of optical lenses disposed between the imager and the exit pupil and receiving emitted image from the imager and comprising first, second, and third optical lenses, the third lens having an optical birefringence greater than about 10 nm/cm, the first and second lens each having an optical birefringence less than about 7 nm/cm and bonded to each other to form a doublet;

a partial reflector disposed on and conforming to a curved major surface of the doublet and having an average optical reflectance of at least 30% in a predetermined wavelength range;

a reflective polarizer disposed on and conforming to a curved major surface of the third lens, the reflective polarizer substantially reflecting light having a first polarization state and substantially transmitting light having an orthogonal second polarization state in the predetermined wavelength range; and a first retarder layer disposed on and conforming to a major surface of the doublet; such that for a cone of light from an image emitted by the imager, the image comprising a spatial frequency of about 70 line pairs per millimeter, filling the exit pupil with a chief ray of the cone of light passing through a center of the opening of the exit pupil and making an angle of about 40 degrees with an optical axis of the optical system, a modulation transfer function (MTF) of the optical system is greater than about 0.15.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. An optical system for displaying an image to a viewer comprising:

a first lens comprising a birefringence of less than about 10 nm/cm and a second lens comprising a birefringence of greater than about 10 nm/cm;

a partial reflector disposed on and conforming to a curved major surface of the first lens and having an average optical reflectance of at least 30% in a predetermined wavelength range; and a reflective polarizer disposed on and conforming to a curved major surface of the second lens;

wherein, a light ray propagating along an optical axis of the optical system, passes through the first and second lenses, the partial reflector and the reflective polarizer without being substantially refracted, and wherein for a cone of light that is incident on the optical system from an object having a spatial frequency of about 70 line pairs per millimeter and comprises a chief ray that after passing through the optical system makes an angle of about 20 degrees with the optical axis, a modulation transfer function (MTF) of the optical system is greater than about 0.2.

2. The optical system of claim 1, wherein the first lens comprises a glass, and the second lens comprises a plastic.

3. The optical system of claim 1, wherein the first lens comprises two first lenses.

4. The optical system of claim 3, wherein the two first lenses form a doublet, a major surface of one first lens substantially conforming to and bonded to a major surface of the other first lens.

5. The optical system of claim 1, wherein for a cone of light incident on the optical system from an object having a spatial frequency of about 60 line pairs per millimeter and comprises a chief ray that after passing through the optical system makes an angle of about zero degrees with the optical axis, a modulation transfer function (MTF) of the optical system is greater than about 0.6.

* * * * *